US012810267B2

(12) United States Patent
Jurss

(10) Patent No.: US 12,810,267 B2
(45) Date of Patent: Nov. 24, 2026

(54) MOBILE SERVICES REMOTE DEPOSIT CAPTURE

(71) Applicant: VISA INTERNATIONAL SERVICE ASSOCIATION, San Francisco, CA (US)

(72) Inventor: Penny Diane Jurss, Leander, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/972,603

(22) Filed: Dec. 6, 2024

(65) Prior Publication Data

US 2025/0094948 A1 Mar. 20, 2025

Related U.S. Application Data

(60) Continuation of application No. 16/822,615, filed on Mar. 18, 2020, now Pat. No. 12,198,111, which is a (Continued)

(51) Int. Cl.

*G06Q 20/10* (2012.01)
*G06Q 20/22* (2012.01)
*G06Q 20/32* (2012.01)

(52) U.S. Cl.

CPC ......... *G06Q 20/108* (2013.01); *G06Q 20/227* (2013.01); *G06Q 20/3221* (2013.01); *G06Q 20/3223* (2013.01)

(58) Field of Classification Search

None

See application file for complete search history.

(56) References Cited

U.S. PATENT DOCUMENTS

| | | | |
|---|---|---|---|
| 5,925,865 | A | 7/1999 | Steger |
| 6,049,785 | A | 4/2000 | Gifford |

(Continued)

FOREIGN PATENT DOCUMENTS

| | | | |
|---|---|---|---|
| AU | 2003201332 | B2 | 6/2004 |
| AU | 2005279689 | B2 | 4/2008 |

(Continued)

OTHER PUBLICATIONS

"Citi Customers Can Deposit Checks with their Phones", Available Online at: http://dialog.proquest.com/professional/docview/2215969470?accountid= 131444, Mar. 13, 2012, pp. 1-2.

(Continued)

*Primary Examiner* — Ayal I. Sharon
(74) *Attorney, Agent, or Firm* — Kilpatrick Townsend & Stockton LLP

(57) ABSTRACT

Systems and methods disclosed herein include a mobile solution to enable users to perform financial transaction over a network using a mobile device. These techniques allow users to maintain a single personal account identifier or number ("PAN") on the user's mobile device and to utilize it to access a plurality of linked financial accounts and sub-accounts. Any one of the accounts can be selected by a user on the mobile device to remotely deposit funds to that account based on an image of a financial payment instrument. The image can be obtained using image capture technology on the user's mobile device. Users can perform a financial transaction using the verified images over a network in order to conduct a remote financial transaction such as applying a deposit, a payment, or cash load to a designated account which is linked to the user's mobile account in real-time or near real-time.

20 Claims, 17 Drawing Sheets

Related U.S. Application Data division of application No. 13/752,010, filed on Jan. 28, 2013, now Pat. No. 10,643,191.

(60) Provisional application No. 61/591,707, filed on Jan. 27, 2012.

(56) References Cited

U.S. PATENT DOCUMENTS

| | | | | |
|---|---|---|---|---|
| 6,058,378 | A | 5/2000 | Clark et al. | |
| 6,119,104 | A | 9/2000 | Brumbelow et al. | |
| 6,324,523 | B1 | 11/2001 | Killeen, Jr. et al. | |
| 6,647,376 | B1 | 11/2003 | Farrar et al. | |
| 7,216,106 | B1 | 5/2007 | Buchanan et al. | |
| 7,377,425 | B1 | 5/2008 | Ma et al. | |
| 7,389,912 | B2 * | 6/2008 | Carlson | G06Q 20/04 235/379 |
| 7,428,984 | B1 | 9/2008 | Crews et al. | |
| 7,494,052 | B1 | 2/2009 | Carpenter et al. | |
| 7,735,721 | B1 | 6/2010 | Ma et al. | |
| 7,792,748 | B1 | 9/2010 | Ebersole et al. | |
| 7,873,200 | B1 | 1/2011 | Oakes, III et al. | |
| 7,876,949 | B1 | 1/2011 | Oakes, III et al. | |
| 7,885,451 | B1 | 2/2011 | Walls et al. | |
| 7,885,880 | B1 | 2/2011 | Prasad et al. | |
| 7,949,587 | B1 | 5/2011 | Morris et al. | |
| 7,962,411 | B1 | 6/2011 | Prasad et al. | |
| 7,970,677 | B1 | 6/2011 | Oakes, III et al. | |
| 7,974,899 | B1 | 7/2011 | Prasad et al. | |
| 8,000,514 | B2 | 8/2011 | Nepomniachtchi et al. | |
| 8,275,715 | B2 | 9/2012 | Caruso et al. | |
| 8,290,237 | B1 | 10/2012 | Burks et al. | |
| 8,320,657 | B1 | 11/2012 | Burks et al. | |
| 8,351,677 | B1 | 1/2013 | Oakes, III et al. | |
| 8,380,626 | B2 | 2/2013 | Huff et al. | |
| 8,392,332 | B1 | 3/2013 | Oakes, III et al. | |
| 8,433,127 | B1 | 4/2013 | Harpel et al. | |
| 8,464,933 | B1 | 6/2013 | Prasad et al. | |
| 8,538,124 | B1 | 9/2013 | Harpel et al. | |
| 8,542,921 | B1 | 9/2013 | Medina | |
| 8,688,579 | B1 | 4/2014 | Ethington et al. | |
| 8,699,779 | B1 | 4/2014 | Prasad et al. | |
| 8,708,227 | B1 | 4/2014 | Oakes, III et al. | |
| 8,768,038 | B1 | 7/2014 | Sherman et al. | |
| 8,837,806 | B1 | 9/2014 | Prasad et al. | |
| 8,864,022 | B2 | 10/2014 | Hernandez | |
| 8,959,033 | B1 | 2/2015 | Oakes, III et al. | |
| 8,977,571 | B1 | 3/2015 | Bueche et al. | |
| 9,129,340 | B1 | 9/2015 | Medina et al. | |
| 9,224,136 | B1 | 12/2015 | Oakes et al. | |
| 9,336,517 | B1 | 5/2016 | Prasad et al. | |
| 9,552,573 | B2 | 1/2017 | Kulpati et al. | |
| 9,779,392 | B1 | 10/2017 | Prasad et al. | |
| 9,779,452 | B1 * | 10/2017 | Medina | G06V 10/20 |
| 9,818,090 | B1 | 11/2017 | Bueche et al. | |
| 9,959,532 | B2 | 5/2018 | Narendra et al. | |
| 10,013,605 | B1 | 7/2018 | Oakes et al. | |
| 10,013,681 | B1 | 7/2018 | Oakes et al. | |
| 10,380,562 | B1 * | 8/2019 | Prasad | G06Q 20/204 |
| 10,380,565 | B1 | 8/2019 | Prasad | |
| 10,482,432 | B1 | 11/2019 | Oakes et al. | |
| 10,521,781 | B1 * | 12/2019 | Singfield | G06Q 20/108 |
| 10,552,810 | B1 * | 2/2020 | Ethington | G06Q 20/042 |
| 10,552,839 | B2 | 2/2020 | Narasimhan | |
| 10,621,559 | B1 | 4/2020 | Oakes et al. | |
| 10,643,191 | B2 * | 5/2020 | Jurss | G06Q 20/227 |
| 10,839,358 | B1 * | 11/2020 | Prasad | G06Q 20/3276 |
| 10,922,766 | B2 * | 2/2021 | Cook | G06Q 20/042 |
| 11,250,398 | B1 * | 2/2022 | Prasad | G06Q 20/3276 |
| 11,461,743 | B1 | 10/2022 | Oakes, III et al. | |
| 11,531,973 | B1 * | 12/2022 | Prasad | G06Q 20/3223 |
| 11,783,306 | B1 * | 10/2023 | Prasad | G06Q 20/3276 705/45 |
| 11,797,960 | B1 | 10/2023 | Prasad | |
| 12,198,111 | B2 * | 1/2025 | Jurss | G06Q 20/3223 |
| 12,229,737 | B2 * | 2/2025 | Prasad | G06Q 20/3223 |
| 12,321,909 | B2 * | 6/2025 | Jurss | G06Q 20/3223 |
| 12,400,223 | B2 | 8/2025 | Dill et al. | |
| 2002/0065774 | A1 | 5/2002 | Young et al. | |
| 2002/0152179 | A1 | 10/2002 | Racov | |
| 2002/0178112 | A1 | 11/2002 | Goeller et al. | |
| 2003/0026404 | A1 | 2/2003 | Joyce et al. | |
| 2004/0133516 | A1 | 7/2004 | Buchanan et al. | |
| 2004/0236688 | A1 | 11/2004 | Bozeman | |
| 2004/0267664 | A1 | 12/2004 | Nam et al. | |
| 2005/0080692 | A1 | 4/2005 | Padam et al. | |
| 2005/0097046 | A1 | 5/2005 | Singfield | |
| 2005/0125342 | A1 | 6/2005 | Schiff | |
| 2006/0106717 | A1 | 5/2006 | Randle et al. | |
| 2006/0144923 | A1 | 7/2006 | VanKirk et al. | |
| 2006/0242063 | A1 | 10/2006 | Peterson et al. | |
| 2007/0156438 | A1 | 7/2007 | Popadic et al. | |
| 2007/0194102 | A1 | 8/2007 | Cohen et al. | |
| 2007/0244811 | A1 | 10/2007 | Tumminaro | |
| 2008/0006685 | A1 | 1/2008 | Rackley, III et al. | |
| 2008/0126145 | A1 | 5/2008 | Rackley, III et al. | |
| 2008/0177662 | A1 | 7/2008 | Smith et al. | |
| 2008/0228615 | A1 | 9/2008 | Scipioni et al. | |
| 2008/0228637 | A1 | 9/2008 | Scipioni et al. | |
| 2008/0228638 | A1 | 9/2008 | Scipioni et al. | |
| 2008/0244700 | A1 | 10/2008 | Osborn et al. | |
| 2008/0247629 | A1 | 10/2008 | Gilder et al. | |
| 2008/0262953 | A1 | 10/2008 | Anderson et al. | |
| 2008/0301441 | A1 | 12/2008 | Calman et al. | |
| 2008/0313047 | A1 | 12/2008 | Casares et al. | |
| 2009/0112763 | A1 | 4/2009 | Scipioni et al. | |
| 2009/0119209 | A1 | 5/2009 | Sorensen et al. | |
| 2009/0141962 | A1 | 6/2009 | Borgia et al. | |
| 2009/0171825 | A1 | 7/2009 | Roman | |
| 2009/0185241 | A1 | 7/2009 | Nepomniachtchi | |
| 2009/0185736 | A1 | 7/2009 | Nepomniachtchi | |
| 2009/0185737 | A1 | 7/2009 | Nepomniachtchi | |
| 2009/0254440 | A1 | 10/2009 | Pharris | |
| 2009/0319425 | A1 | 12/2009 | Tumminaro et al. | |
| 2009/0320106 | A1 | 12/2009 | Jones et al. | |
| 2010/0038419 | A1 | 2/2010 | Blake et al. | |
| 2010/0150424 | A1 | 6/2010 | Nepomniachtchi et al. | |
| 2010/0161485 | A1 | 6/2010 | Bulawa et al. | |
| 2010/0174647 | A1 | 7/2010 | Kowalchyk et al. | |
| 2010/0198733 | A1 | 8/2010 | Gantman et al. | |
| 2010/0280859 | A1 | 11/2010 | Frederick, II | |
| 2011/0055077 | A1 | 3/2011 | French et al. | |
| 2011/0055585 | A1 | 3/2011 | Lee | |
| 2011/0091092 | A1 | 4/2011 | Nepomniachtchi et al. | |
| 2011/0134248 | A1 | 6/2011 | Heit et al. | |
| 2011/0218871 | A1 | 9/2011 | Singh et al. | |
| 2011/0251892 | A1 | 10/2011 | Laracey | |
| 2011/0280450 | A1 | 11/2011 | Nepomniachtchi et al. | |
| 2011/0320357 | A1 * | 12/2011 | Gilson | G06Q 40/00 705/45 |
| 2011/0320358 | A1 * | 12/2011 | Harris | G06Q 20/042 705/45 |
| 2012/0024946 | A1 | 2/2012 | Tullis et al. | |
| 2012/0054095 | A1 | 3/2012 | Lesandro et al. | |
| 2012/0066105 | A1 | 3/2012 | O'Neill et al. | |
| 2012/0084210 | A1 | 4/2012 | Farahmand | |
| 2012/0116957 | A1 | 5/2012 | Zanzot et al. | |
| 2012/0116963 | A1 | 5/2012 | Klein et al. | |
| 2012/0116973 | A1 | 5/2012 | Klein et al. | |
| 2012/0136732 | A1 | 5/2012 | McMillen et al. | |
| 2012/0177281 | A1 | 7/2012 | Frew | |
| 2012/0179609 | A1 * | 7/2012 | Agarwal | G06Q 20/042 705/35 |
| 2012/0226609 | A1 | 9/2012 | Ebbert et al. | |
| 2012/0230577 | A1 | 9/2012 | Calman et al. | |
| 2012/0232968 | A1 | 9/2012 | Calman et al. | |
| 2012/0246069 | A1 | 9/2012 | Edwards et al. | |
| 2012/0259776 | A1 | 10/2012 | Bajaj et al. | |
| 2012/0259778 | A1 | 10/2012 | Banerjee et al. | |
| 2012/0292388 | A1 | 11/2012 | Hernandez | |
| 2013/0028502 | A1 | 1/2013 | Nepomniachtchi et al. | |
| 2013/0067208 | A1 | 3/2013 | Brinkman et al. | |
| 2013/0084010 | A1 | 4/2013 | Ross et al. | |
| 2013/0085935 | A1 | 4/2013 | Nepomniachtchi et al. | |

(56) References Cited

U.S. PATENT DOCUMENTS

| | | | | |
|---|---|---|---|---|
| 2013/0097076 | A1 | 4/2013 | Love et al. | |
| 2013/0097078 | A1 | 4/2013 | Wong et al. | |
| 2013/0120595 | A1 | 5/2013 | Roach et al. | |
| 2013/0121490 | A1 | 5/2013 | Boliek et al. | |
| 2013/0124414 | A1 | 5/2013 | Roach et al. | |
| 2013/0125209 | A1 | 5/2013 | Schumacher | |
| 2013/0155474 | A1 | 6/2013 | Roach et al. | |
| 2013/0198071 | A1 * | 8/2013 | Jurss | G06Q 20/3223 705/42 |
| 2013/0259357 | A1 | 10/2013 | Ebbert et al. | |
| 2013/0346263 | A1 | 12/2013 | Como et al. | |
| 2014/0052697 | A1 | 2/2014 | Williams et al. | |
| 2014/0108249 | A1 | 4/2014 | Kulpati et al. | |
| 2016/0027012 | A1 | 1/2016 | Patterson | |
| 2017/0011398 | A1 | 1/2017 | Narasimhan | |
| 2017/0091735 | A1 | 3/2017 | Kulpati et al. | |
| 2018/0005229 | A1 | 1/2018 | Grassadonia | |
| 2018/0005323 | A1 | 1/2018 | Grassadonia | |
| 2019/0378112 | A1 | 12/2019 | Grassadonia | |
| 2020/0090148 | A1 | 3/2020 | Lawrence et al. | |
| 2020/0175488 | A1 | 6/2020 | Kulpati et al. | |
| 2020/0219073 | A1 * | 7/2020 | Jurss | G06Q 20/227 |
| 2022/0036338 | A1 | 2/2022 | Ungerland et al. | |
| 2023/0013039 | A1 * | 1/2023 | Jurss | G06Q 20/3221 |
| 2023/0222460 | A1 * | 7/2023 | Prasad | G06Q 20/3223 705/42 |
| 2025/0328880 | A1 * | 10/2025 | Jurss | G06Q 20/3223 |

FOREIGN PATENT DOCUMENTS

| | | | |
|---|---|---|---|
| CA | 2724049 | A1 | 7/2011 |
| CA | 2901949 | A1 | 11/2016 |
| CN | 101263524 | A | 9/2008 |
| WO | 2018005635 | A2 | 1/2018 |

OTHER PUBLICATIONS

"PNC Bank Extending Check Deposit By Phone to All Customers", Tribune—Review/Pittsburgh Tribune—Review, Available Online at: http://dialog.proquest.com/professional/docview/872466223?accountid= 131444, May 31, 2011, 1 page.

"Remote Deposit Capture Goes Mobile: Mitek Systems Launches First Mobile Deposit Check Deposit and Bill Pay Application", Remote Deposit Capture, Also Available at: http://www.remotedepositcapture.com/news/Remote.Deposit-Capture-Goes-Mobile-Mitek-Systems.asp, Jan. 22, 2008, pp. 1-2.

"Sub Account Guide", UC Irvine Division of Finance and Administration, Accounting & Fiscal Services, Available Online at; https://accounting.uci.edu/support/guides/instructions/howtosubacct.html, Accessed from Internet on Aug. 1, 2022, pp. 1-3.

"Sub-Accounts", UC Davis Finance & Business, Available Online at: https://financeandbusiness.ucdavis.edu/finance/accounting-financial-reporting/processes/sub-accts#:-:text=Sub%2Daccounts%20are%20a%20feature,for%20a%20particular%20faculty%20member, Accessed from Internet on Aug. 1, 2022, pp. 1-4.

"TD Bank Introduces its Mobile Deposit Feature for Android and Iphone Devices", PR Newswire, Available Online at: http://dialog.proquest.com/professional/docview/14333, Sep. 18, 2013, pp. 1-2.

U.S. Appl. No. 17/954,181 , Final Office Action, Mailed on Jul. 1, 2024, 17 pages.

U.S. Appl. No. 17/954,181 , Non-Final Office Action, Mailed on Dec. 12, 2023, 14 pages.

Block , "No. Bank? No Problem. Phone Apps Let You Deposit Checks: More Banks are Offering New Service To Their Customers", USA Today, Available Online at: http://dialog.proquest.com/professional/docview/741008438?accountid=131444, 2010, 2 pages.

Gonzales , "Technology Phone App is Money in the Bank Mobile Users Can Deposit Checks by Sending Snapshots", The Sacramento Bee, Available Online at: http://dialog.proquest.com/professional/docview/916103179?accountid= 131444, 2012, 2 pages.

Iqbal , "BB&T Offers New Feature to Deposit Paper Checks Via Phone Cameras", SNL Bank & Thrift Daily, Available Online at: http://dialog.proquest.com/professional/docview/1011009474?accountid=131444, 2012, 2 pages.

Liberto , "Sub Account", Investopedia, Available Online at: https://www.investopedia.com/terms/s/sub-account.asp, Feb. 28, 2021, 7 pages.

Yerak , "New Wave of Banking: Check Deposit Via Smart-Phone Photo", McClatchy Tribune News Service, Available Online at: https://phys.org/news/2010-07-banking-deposit-smart-phone-photo.html, Jul. 21, 2010, 3 pages.

Non-Final Office Action, mailed Apr. 30, 2026, U.S. Appl. No. 19/195,989, 16 pages.

* cited by examiner

MOBILE SERVICES REMOTE DEPOSIT CAPTURE

CROSS-REFERENCES TO RELATED APPLICATIONS

This application is a continuation application of U.S. patent application Ser. No. 16/822,615, filed Mar. 18, 2020 which is a divisional application of U.S. patent application Ser. No. 13/752,010, filed Jan. 28, 2013, now U.S. Pat. No. 10,643,191, issued May 5, 2020, which claims priority to U.S. Provisional Patent Application No. 61/591,707, filed Jan. 27, 2012, entitled "MOBILE SERVICES REMOTE DEPOSIT CAPTURE," which are incorporated herein in its entirety.

The application is related to U.S. patent application Ser. No. 17/954,181, filed Sep. 27, 2022, which is a continuation application of U.S. patent application Ser. No. 16/822,615, filed Mar. 18, 2020 which is a divisional application of U.S. patent application Ser. No. 13/752,010, filed Jan. 28, 2013, now U.S. Pat. No. 10,643,191, issued May 5, 2020, which claims priority to U.S. Provisional Patent Application No. 61/591,707, filed Jan. 27, 2012, entitled "MOBILE SERVICES REMOTE DEPOSIT CAPTURE," which are incorporated herein in its entirety.

FIELD OF THE INVENTION

The embodiments described herein relate generally to data processing systems. More particularly, the embodiments relate to performing financial transactions over a network using a mobile device.

SUMMARY

Embodiments described herein include a mobile solution to enable users to perform financial transaction over a network using a mobile device. These techniques allow users to maintain a single personal account identifier or number referred to as a ("PAN") on the user's mobile device and to utilize the PAN to access a plurality of linked financial accounts and sub-accounts. Any one of the accounts can be selected on the mobile device to remotely deposit funds to that account based on an image of a verified financial payment instrument. In one embodiment, the image can be obtained using image capture technology on the user's mobile device. Users can then perform financial transactions using these verified images in order to conduct a remote financial transaction such as applying a deposit, a payment, or cash load to a designated account which is linked to the user's mobile account in real-time or near real-time.

Embodiments include a method of performing a financial transaction using a mobile device including (1) capturing an image of a financial token on a user's mobile device, (2) processing the captured image for a transaction over a network, (3) receiving a selection from the user of a first account for the transaction from one or more accounts of the user, where a unique personal account identifier associated with a mobile account of the user is stored on the user's mobile device and is linked with the one or more user accounts to enable payment to any of the accounts with the mobile device based on the personal account identifier, and (4) communicating the selected first account and an image capture element to a server for processing the transaction based on the captured image. Embodiments also include a method of performing a financial transaction over a network including (1) receiving a transaction request message for a transaction based on an image of a financial token captured at a user's mobile device, where the transaction request message includes a selection of a first account from one or more accounts of the user and an image capture element, and where a unique personal account identifier associated with a mobile account of the user is stored on the mobile device and is linked with the one or more user accounts to enable payment to any of the accounts with the mobile device based on the personal account identifier, and (2) communicating the transaction request message over a payment processing network to an issuer associated with the selected first account for authorization of the transaction.

A mobile device apparatus is also disclosed including (1) an imaging component to capture an image of a financial token for a transaction over a network, (2) a processor configured to process the transaction based on the captured image, (3) a memory coupled with the processor and adapted to store a unique personal account identifier on the mobile device that is associated with a mobile account of the user, where the personal account identifier is linked with one or more accounts of the user to enable payment to any of the accounts based on the personal account identifier, (4) an input device adapted to receive a selection from the user of a first account for the transaction from the one or more user accounts linked with the personal account identifier, and (5) a transceiver to communicate the selected first account and an image capture element to a server for authorization of the transaction.

Embodiments also include a server apparatus containing (1) a processor configured to perform a financial transaction over a network initiated from a user's mobile device, (2) a memory coupled to the processor and configured to store information for one or more accounts of the user that is linked with a unique personal account identifier associated with a mobile account of the user to enable payment to any of the accounts based on the personal account identifier, (3) a receiver adapted to receive a transaction request message for a transaction based on an image of a financial token captured at the user's mobile device, where the transaction request message includes a selection of a first account from the one or more user accounts, and (4) a transmitter to communicate the transaction request message over a payment processing network to an issuer associated with the selected first account for authorization of the transaction.

These and other details of embodiments of the invention are described in the following description, claims, and figures.

BRIEF DESCRIPTION OF THE DRAWINGS

A better understanding of at least certain embodiments of the invention can be obtained from the following detailed description in conjunction with the following drawings, in which.

DETAILED DESCRIPTION

Figure 1A:
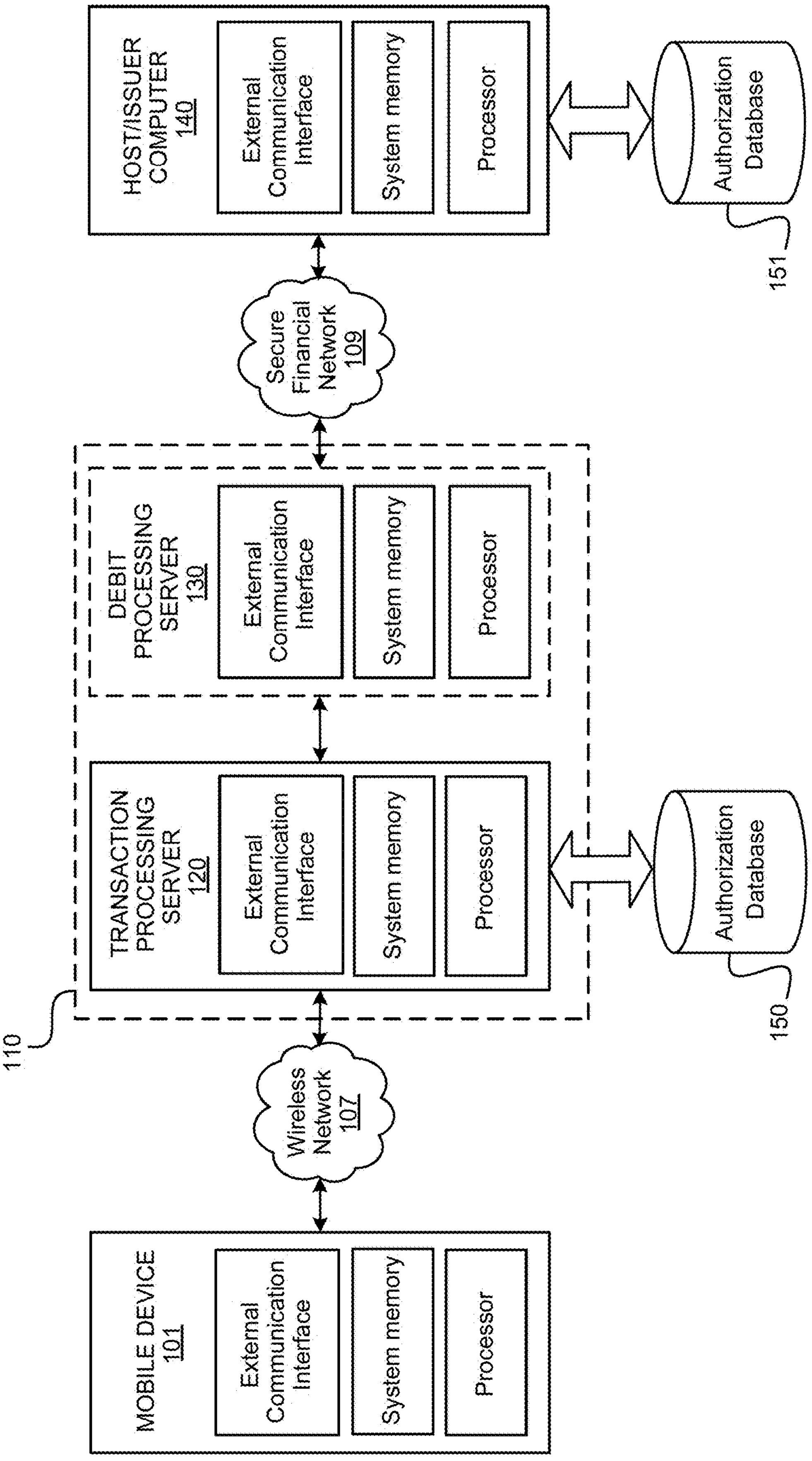
FIG. 1A depicts an example block diagram of a system for performing a financial transaction using a mobile device according to one illustrative embodiment.

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

The systems and methods introduced herein are adapted to provide a mobile solution to enable users to perform financial transaction over a network using a mobile device. These techniques allow account holders (i.e., users) to (1) maintain a single personal account identifier or number (referred to herein as a "PAN") on the user's mobile device, such as a mobile phone, and (2) utilize that PAN to access a plurality of linked financial accounts and sub-accounts. Any one of the sub-accounts can be selected on the mobile device to remotely deposit funds to that account using an image of a verified financial payment instrument. In one embodiment, the image can be obtained using image capture technology on the user's mobile device. Users can then perform a financial transaction using the verified images over a network in order to conduct a remote financial transaction such as applying a deposit, a payment, or cash load to a designated account which is linked to the user's mobile account in real-time or near real-time. For instance, the transaction may be to deposit a check into one of the user's account remotely using a mobile device, which can be accomplished by capturing an image of the check on the user's mobile device and processing the captured image for the transaction.

Additionally, the techniques described herein are adapted to provide a mobile solution to enable users to apply the funds of a deposited check to one or more of their accounts which can be linked to their mobile account. The PAN can be associated with a mobile account associated with the user's mobile device. The PAN can be stored in memory on the user's mobile device and can be linked to multiple user accounts for conducting financial transactions to any of the user's accounts based on the PAN. This includes, but is not limited to, a deposit, a loan, a prepaid, or a credit account linked to a PAN associated with the mobile account.

In one embodiment, a method is provided for selecting a first account on a user's mobile device, capturing an image of a check (or other financial token) using the mobile device or device in communication with the mobile device, verifying the quality of the image of the check for processing the transaction, communicating an authorization request to a server based on the image of the check for authorization, and receiving a response to the authorization request. Other embodiments include performing a set of security inspections on the image of the check. The first account can be linked to a plurality of sub-accounts and the user can be further prompted to select which sub-account to receive the deposit of the check or other instrument.

In further embodiments, a mobile application can be stored on the user's mobile device and configured to perform the financial transactions using the PAN linked to multiple user accounts. Also, the multiple user accounts can be associated with different accounts of different account issuers as long as they are linked to the user's mobile account using the PAN. In such a case, the PAN can be used to perform a transaction accessing one or more of multiple different accounts or account types. In addition, images of multiple financial payment instruments can be captured and aggregated for processing as a single transaction. The transactions involving these aggregated instruments can be further aggregated with other unrelated transactions, such as transactions from an Automatic Teller Machine ("ATM"), and processed as a single transaction.

Figure 2:
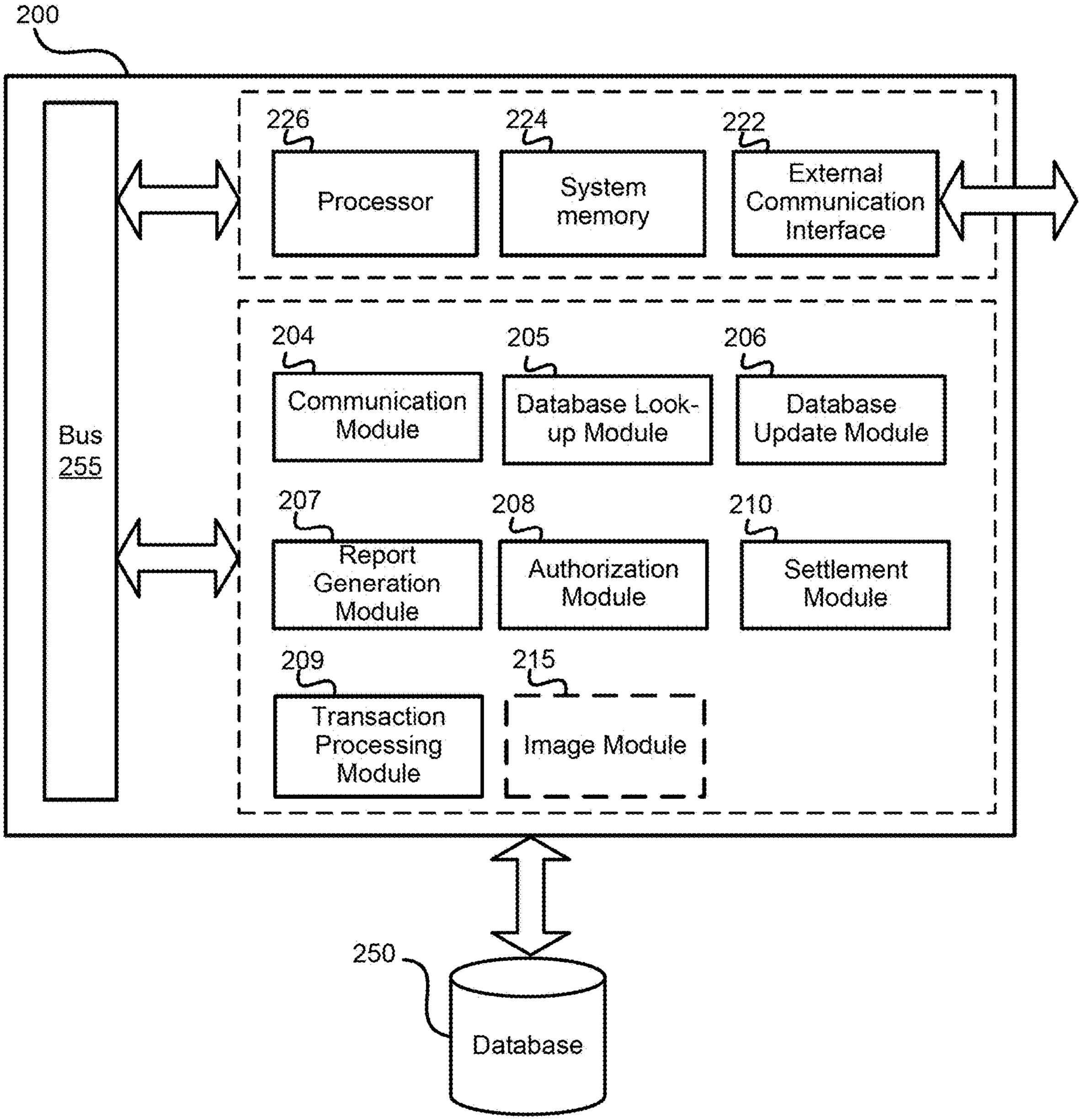
FIG. 2 depicts an example block diagram of a server computer in a payment processing network according to one illustrative embodiment.

Other embodiments include a transaction processing server that performs the financial transactions and that can be adapted to receive and process transaction requests from a user's mobile device based on captured images of financial instruments. As used herein, the term "server" refers to a computer or cluster of computers implemented in computer hardware which is adapted to manage access to resources in a network. For example, the server computer can be a large mainframe, a minicomputer cluster, or a group of servers functioning as a unit. In one example, the server computer may be a database server coupled to a Web server. An example of a server computer 200 in FIG. 2 is described with reference to a payment processing network. The transaction processing server can be configured to perform the authorization locally by running a local authorization process on behalf of one or more account issuers. In other embodiments, the transaction processing server can communicate transaction requests over a payment processing network to an issuer associated with a selected user account for authorization in real-time or near real-time. In such embodiments, the transaction processing server can reformat transaction request messages it receives from mobile devices in a first format and forward them to a host server located at the issuer of the account in a second format for processing at the host. Alternatively, it is possible that the transaction processing service can be configured such that no reformatting of the messages received is required. There is a unique processing code that denotes a check deposit, payment, or load transaction and the receiving host should process it accordingly.

In one embodiment, once the image and transaction data is captured at the mobile device, the image can be verified and a standard message can be generated to be sent to the transaction processing server (or other authorization platform) for authorization. The transaction can be sent in an authorization request message to a transaction processing service for validation and subsequent approval through a payment processing network. Once the transaction is authorized and approved, a second message can be generated to transmit the image to an image processing service. The image processing service can be, for example, an image clearing platform. In other embodiments, the captured image itself can be reformatted and sent in a message directly to the authorization platform.

The systems and methods described herein can be made available as a downloadable application on mobile devices which have a camera or other means to capture a picture of the check (e.g. iPhone, Android, Blackberry, iPad, etc.). This functionality can potentially be performed via a mobile device capable of (1) capturing an image of a verifiable financial payment instrument and (2) conducting a transaction via a mobile web browser.

I. Exemplary Systems

Provided below is a description of an illustrative system in which embodiments provided herein may be implemented and utilized. Although some of the entities may be depicted as separate components, in some instances one or more of the components may be combined into a single device or location (and vice versa). Similarly, although certain functionality may be described as being performed by a single entity or component within the system, the functionality may, in some instances, be performed by multiple components or entities (and vice versa). Communication between entities and components may comprise the exchange of data or information using electronic messages on any suitable electronic communication medium as described below.

FIG. 1A depicts an example block diagram of a system for performing a financial transaction using a mobile device according to one illustrative embodiment. In this example, the payment processing network 110 is disposed between the mobile device 101 and the host/issuer computer 140. Some components of an illustrative payment processing network are described below with reference to FIG. 2 for illustration purposes. Furthermore, mobile device 101, the payment processing network 110, and the host/issuer computer 140 may all be in operative communication with each other although not depicted in FIG. 1A. One or more communication channels may exist between each of these entities, whether or not these channels are used in conducting a financial transaction. In the illustrated embodiment, mobile device 101 is coupled to payment processing network 110 via a wireless network 107. The payment processing network 110 includes a transaction processing server 120 and, optionally, a debit processing server 130 coupled thereto. Payment processing network 110 is further coupled with a host server of an issuer (e.g., a bank) over a secure financial network 109. As used herein, the term "issuer" refers to any business entity (e.g., a bank or other financial institution) that maintains financial accounts and can issue payment devices such as a credit or debit card.

In the illustrated embodiment of FIG. 1A, each of the mobile device 101, transaction processing server 120, debit processing server 130, and host computer 140 include an external communications interface for communicating over a network, a processor for facilitating financial transactions and the exchange of electronic messages, and a system memory coupled with the processor and external communications interface that includes one or more modules stored therein to generate and utilize electronic messages. As used in this context, an "external communication interface" may refer to any hardware, software, or combination thereof that enables data to be transferred between two or components of a system. Some examples of external communication interfaces may include a modem, a network interface card (e.g., Ethernet card), a communications port, a Personal Computer Memory Card International Association (PCMCIA) slot and card, or equivalents thereof. Data transferred via these external communications interface may be in the form of signals which may be electrical, electromagnetic, optical, or any other signal capable of being sent and received by an external communications interface. Electronic messages may comprise data or instructions and may be provided between one or more of the external communications interfaces via a communications path or channel. Any suitable communication path or channel may be used such as, for instance, a wire or cable, fiber optics, a telephone line, a cellular link, a radio frequency (RF) link, a WAN or LAN network, the Internet, or any other suitable equivalents thereof.

It should be understood, however, that embodiments are not limited to this particular configuration as the transaction processing server 120 may perform many of the functions of the debit processing server 130 and host computer 140 and vice versa. In one embodiment, the transaction processing server 120 may operate as the host computer 140 and maintain account information within database 150 operated as part of an overall transaction processing service. Transaction processing server 120 is shown coupled with an authorization database 150 and Host computer 140 is likewise coupled with an authorization database 151.

In one embodiment, transactions may be conducted over the wireless network 107 using a user's mobile device 101 using "authorization request messages" as well as responses to those messages. As used herein, the term "authorization request message" refers to any electronic message that is sent over a payment processing network or to an account issuer to request authorization for a particular transaction. An authorization request message according to some embodiments may comply with an International Organization for Standardization ("ISO"). For instance, an authorization request message may comply with ISO 8583, which is a standard message format for systems that exchange electronic transaction information associated with a payment using a payment device or payment account. The authorization request message may include an issuer account identifier that may be associated with a payment device or account. An authorization request message may also include additional data elements corresponding to "identification information" including, by way of example, a service code, a card verification value ("CVV"), a dynamic card verification value ("dCVV"), or an expiration date, etc. An authorization request message may also include any information associated with a current transaction, such as the amount, merchant identifier, merchant location, etc., as well as any other information that may be utilized in determining whether to identify or authorize a transaction.

An "authorization response message" may be any electronic message reply to an authorization request message generated by an issuing financial institution or a payment processing network. The authorization response message may include, by way of example only, one or more of the following status indicators: (1) transaction approved; (2) transaction declined; or (3) response pending more information. The authorization response message may also include an authorization code, which may be a code that a credit card issuing bank returns in response to an authorization request message (either directly or through the payment processing network) to a merchant's access device (e.g. POS equipment) that indicates approval of the transaction. The code may serve as proof of authorization. In some embodiments, a payment processing network may generate or forward the authorization response message to the merchant.

Figure 1B:
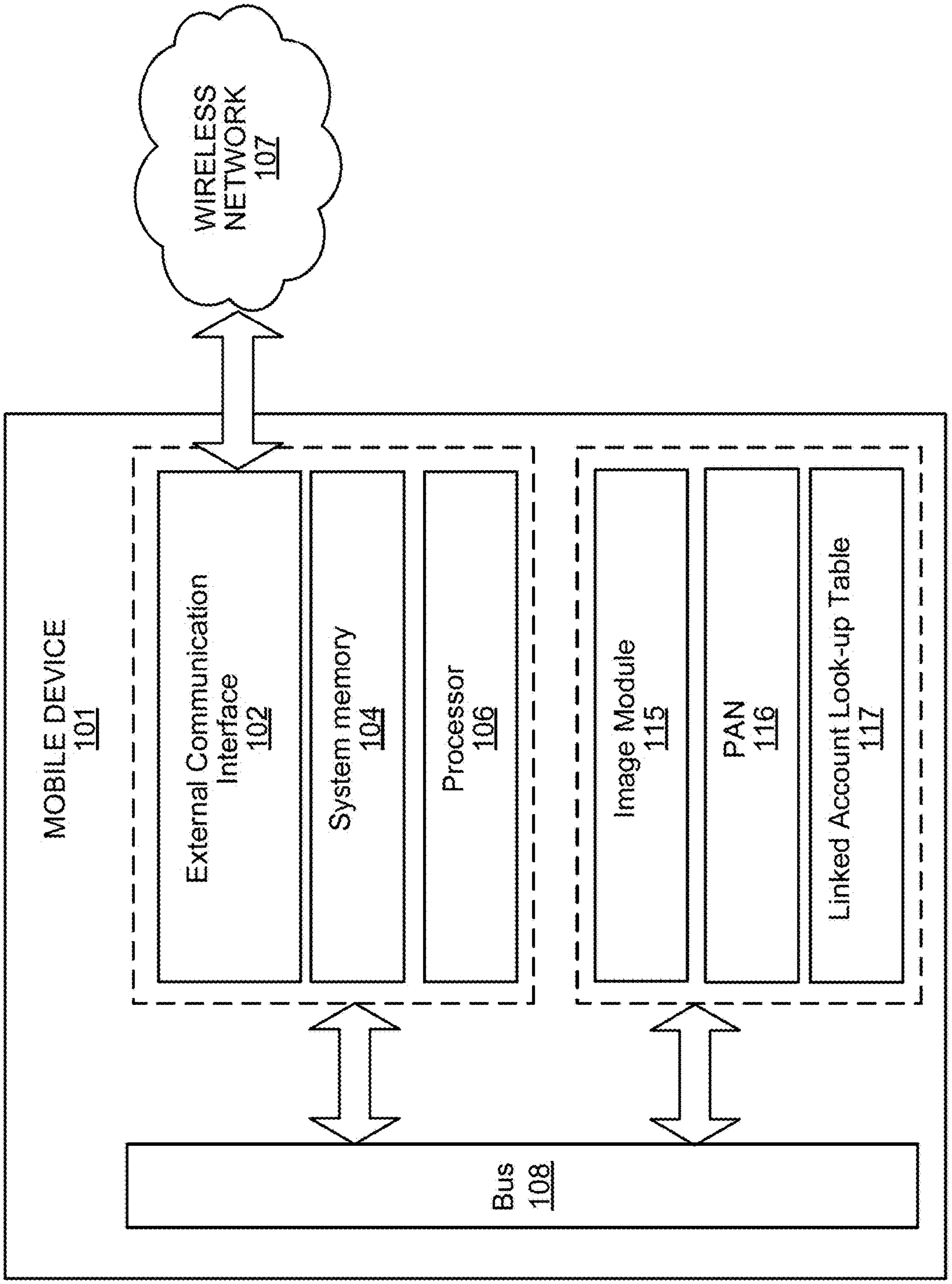
FIG. 1B depicts an example block diagram of a mobile device for performing a financial transaction over a network according to one illustrative embodiment.

FIG. 1B depicts an example block diagram of a mobile device for performing a financial transaction over a network according to one illustrative embodiment. As used herein, the term "mobile device" refers to any electronic device that may be transported and operated by a user, which may also provide remote communication capabilities to a network. A mobile device 101 may comprise any suitable hardware, software, or combination thereof for performing such functions, and may also include multiple devices or components (e.g. when a device has remote access to a network by tethering to another device). Examples of mobile devices include mobile phones (e.g. cellular phones) or other wireless handsets, PDAs, tablet computers, netbooks, laptop computers, personal music players, pagers, hand-held specialized readers, etc. Other examples include smart cards, magnetic stripe cards, keychain devices, payment cards, security cards, access cards, smart media, transponders, and the like. In some embodiments, mobile device 101 can be integrated within a portable user device and embodied in the same device with a portable user device. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Mobile device 101 can then serve to support remote check deposit/payment transactions of financial tokens. As used herein, the term "financial token" refers to any financial instrument for payment or deposit of value to an account, the authenticity of which can be verified. Examples could include, but are not limited to, a financial payment instrument, check, money order, coupon, game card, etc.

In the illustrated embodiment of FIG. 1B, mobile device 101 includes an external communication interface 102 for communicating over the wireless network 107, a processor 106, and system memory 104, each coupled together via bus 108, which can be any suitable interconnect bus, such as a data or instruction bus. Mobile device 101 further includes an image module 115, PAN 116, and Linked Account Look-up Table 117, each coupled together via bus 108. In this embodiment, mobile device 101 can be adapted to capture images of financial tokens using image capture technology coupled with the image module 115 on mobile device 101, or using a device in communication with the image module 115. Image module 115 can include an image processing service adapted to capture images and store them on the mobile device. The image processing service can include computer-readable code that can be utilized to capture an image on a mobile device and verify the image quality and data for further processing. In certain embodiments, the image from the mobile device may be conformed to "Check 21" quality. "Check 21" refers to the Check Clearing for the 21$^{st}$ Century Act, which is United States Federal Law, Pub. L. 108-100, enacted on Oct. 28, 2003 by the 108$^{th}$ Congress. The Act allows a recipient of a paper check to create a digital representation of it into an electronic format that can be used as a substitute check to eliminate the need for further handling of the physical document. Image module 115 can convert the captured images into "Check 21" quality and then the image of the check can be displayed to the user on the mobile device to confirm the check and captured image. Once confirmed, the image quality of the check can be further verified by image module 115 and a set of security inspections can be performed to verify that the check is valid and has not already been processed or encoded. Image module 115 can further provide the associated magnetic ink character recognition ("MICR") information for the check and any additional verification information necessary for processing the transaction.

As discussed above, the mobile device 101 includes a PAN 116 stored in memory that is associated with a mobile account of the device and that can be linked to one or more accounts and sub-accounts of the user. In FIG. 1B, mobile device 101 further includes a linked account look-up table 117 coupled with the PAN stored in memory that can be used to link various of the user's accounts from various issuers with the PAN stored on the user's mobile device. When a request for a transaction is received, embodiments are adapted to match the selected user account number with the user's PAN. In one embodiment, the accounts linked to the user's PAN are obtained through sending messages (e.g., ISO messages) between the mobile device and the transaction processing platform as well as messages to the host (or other authorization process platform). These messages are used to get a list of accounts if multiple accounts are supported for a single account type. If an issuer does not support multiple accounts, then only a primary selection may be presented to the user based on the account type selected.

In one embodiment, mobile device 101 can include a processor 106 capable of executing a series of computer instructions stored in a storage medium (e.g., memory 104) of the device. The instructions can be downloaded to the device via a wireless or wired connection or via any other suitable means. In such an embodiment, the computer instructions can function as a specialized application to facilitate communication of transaction and check deposit information to the transaction processing server 120 and may therefore be available as downloadable applications for smart phones which include image capture technology. In an alternative embodiment, mobile device 101 can include instructions for operating a mobile browser. In such an embodiment, mobile device 101 may communicate transaction and check deposit information to the transaction processing server 120 via a mobile browser. Functionality of the present embodiments may therefore be performed via a mobile device capable of capturing an image of a check and then conducting a transaction via a mobile web browser.

FIG. 2 depicts an example block diagram of a server computer in a payment processing network according to one illustrative embodiment. The payment processing network 110 may include data processing subsystems, networks, and operations used to support and deliver authorization services, exception file services, and clearing and settlement services. For example, the payment processing network 110 may comprise a server computer, coupled to a network interface (e.g. by an external communication interface), and a database(s) of information. An exemplary payment processing network may include VisaNet™, etc. as well as equivalents thereof. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 110 may use any suitable wired or wireless network, including the Internet.

Although many of the data processing functions and features of some embodiments may be present in the payment processing network 110 (and a server computer therein), it should be understood that such functions and features could be present in other components such as the issuer computer 140, and need not be present in the payment processing network 110, or a server computer therein.

With reference to FIG. 2, an example server computer 200 in payment processing network 110 is shown. Server 200 is illustrated as including a plurality of hardware and software modules, however, it should be appreciated that this is provided for illustration purposes only as each of the modules and associated functionality may be provided or performed by the same or different components. In addition, server 200 may, for example, perform some of the relevant functions and operations described herein with reference to the payment processing network 110 through use of any suitable combination of software instructions and hardware configurations. It should be noted that although FIG. 2 illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s).

Server 200 is shown as comprising a processor 226, system memory 224 (which may comprise any combination of volatile or non-volatile memory such as buffer memory, RAM, DRAM, ROM, flash, or any other suitable memory device(s)), and an external communication interface 222. Moreover, one or more of the modules 204-215 may be disposed within one or more of the components of the system memory 224, or may be externally located. As was noted above, the software and hardware modules shown in FIG. 2 are provided for illustration purposes only and the configurations are not intended to be limiting. The processor 226, system memory 224 and external communication interface 222 may be used in conjunction with any of the modules described below to provide a desired functionality.

The communication module 204 may be configured or programmed to receive and generate electronic messages comprising information transmitted through the server 200 to or from any of the entities shown in FIG. 1. When an electronic message is received by the server computer 200 via external communication interface 222, it may be passed to the communications module 204. The communications module 204 may identify and parse the relevant data based on a particular messaging protocol used in the server 200. The received information may comprise, for instance, identification information, transaction information, or any other information that the payment processing network 110 may utilize in authorizing a financial transaction or performing a settlement and clearing procedure. The communication module 204 may then transmit any received information to an appropriate module within the server computer 200 (e.g. via a system bus line 255). The communication module 204 may also receive information from one or more of the modules in server computer 200 and generate an electronic message in an appropriate data format in conformance with a transmission protocol used in the server 200 so that the message may be sent to one or more components within the server 200 (e.g. to an issuer computer 140). The electronic message may then be passed to the external communication interface 222 for transmission. The electronic message may, for example, comprise an authorization response message (e.g. to be transmitted to a user conducting a transaction from the user's mobile device) or may be an authorization request message to be transmitted or forwarded to an issuer.

Server 200 within a payment processing network may include one or more databases such as authorization database 250. The database 250 shown in this example may comprise more than one database and may be located in the same or different locations. The authorization database 250 may contain information related to a payment device or a payment account as well as any other suitable information (such as transaction information) associated with the payment account. For example, the authorization database 250 may comprise a relational database having a plurality of associated fields, including an account identifier, an issuer associated with the account, expiration date of a payment device, verification value(s), an amount authorized for a transaction, a user name, user contact information, prior transaction data, etc. In some embodiments, the authorization module 208 may utilize some or all of the information stored in the authorization database 250 when authorizing a transaction.

The illustrated embodiment further includes a database look-up module 205 that may be programmed or configured to perform some or all of the functionality associated with retrieving information from one or more databases 250. In this regard, the database look-up module 205 may receive requests from one or more of the modules of server 200 (such as communication module 204, authorization module 208, or settlement module 210) for information that may be stored in one or more of the databases 250. The database look-up module 205 may then determine and query an appropriate database. The database update module 206 may be programmed or configured to maintain and update the databases such as authorization database 250. In this regard, the database update module 206 may receive information about a user, financial institution, a payment device, or current or past transaction information from one of the modules discussed herein. This information may then be stored in the appropriate location in the database 250 using any suitable storage process.

The report generation module 207 may be programmed or configured to perform some or all of the functionality associated with generating a report regarding a user, an account, a transaction or transactions, or any other entity or category of information with regard to server 200. This may include, for instance, identifying patterns (such as patterns that indicate a fraudulent transaction or transactions) and generating one or more alerts that may be sent (e.g. via communication module 204 and external communication interface 222) to one or more entities in the server 200, including the user, merchant, or issuer. The report generation module may also, for example, request information from one or more of the databases 250 via database look-up module 205.

The authorization module 208 may be configured or programmed to perform some or all the functionality associated with authorizing a financial transaction associated with an authorization request message. The authorization request message may be generated by a user's mobile device 101 and communicated to the transaction processing server 120. The authorization request message may include any suitable information that may be used to authorize or identify the transaction, and may be generated in response to an interaction between the mobile device 101 and an access device. In some embodiments, the authorization request message may comprise the unique PAN in the routing information, and may also include MICR or other financial token data. The authorization module 208 may, for instance, be programmed or configured to compare the information received by via the authorization request message with stored information at the server 200 or a database 250 (such as comprising verification values). In some embodiments, if the received and stored values match, the authorization module 208 may authorize the transaction (or may be more likely to authorize the transaction) and may instruct the communication module 204 to generate an authorization response message. The authorization module 208 may also communicate the authorization request message to the host/issuer computer 140 for authorization.

In at least certain embodiments, transaction processing module 209 is capable of receiving, logging, and communicating transaction details between various other entities in various communication channels on the network. Transaction processing module 209 refers to an entity or a network of suitable entities that have information related to an account associated with a user. This information includes data associated with the account and an issuer or host for the account such that transaction processing module 209 can receive account information from mobile device 101 and can communicate it to a correct host 140 associated with the account. The account information may include user profile information, account numbers, PIN data, and other suitable information.

Transaction processing module 209 is further capable of receiving transaction information in a first message format and generating a message including the transaction details in a second message format. Once an image of a financial token is captured on the mobile device 101, the image can be verified and reformatted into an ISO standard message prior to authorization. The transaction (e.g., deposit) can be sent in an ISO authorization request message for validation and subsequent approval through the payment processing network. Transaction processing module 209 can include deposit, payment, and cash load options. The financial institution can configure what transactions are supported. For instance, the "deposit" option can be available for checking, savings, credit, loan, or other accounts, whereas the "payment" option can be available for loan and credit account payment options. In addition, the "cash load" option can be available for prepaid accounts. This capability can be made available for any transaction processing mobile solution that supports debit, credit, or prepaid accounts, and can have web services. The transaction processing module 209 can additionally have the ability to support deposit, payment, or load transactions for financial institutions where the transaction processor is not the host computer 140, thus leveraging messaging between the payment processing network platform (e.g., VisaNet) and the transaction processing server 120.

In alternate embodiments, the transaction processing module 209 may be stand-alone and have or operate a server computer or multiple server computers, similar to server 200, and may include a database such as authorization database 250. In addition, FIG. 2 shows that image module 215 (corresponding to image module 115 of FIG. 1B), discussed above, can optionally be located on the transaction processing server 120, or can be located on a third-party computer.

Figure 3A:
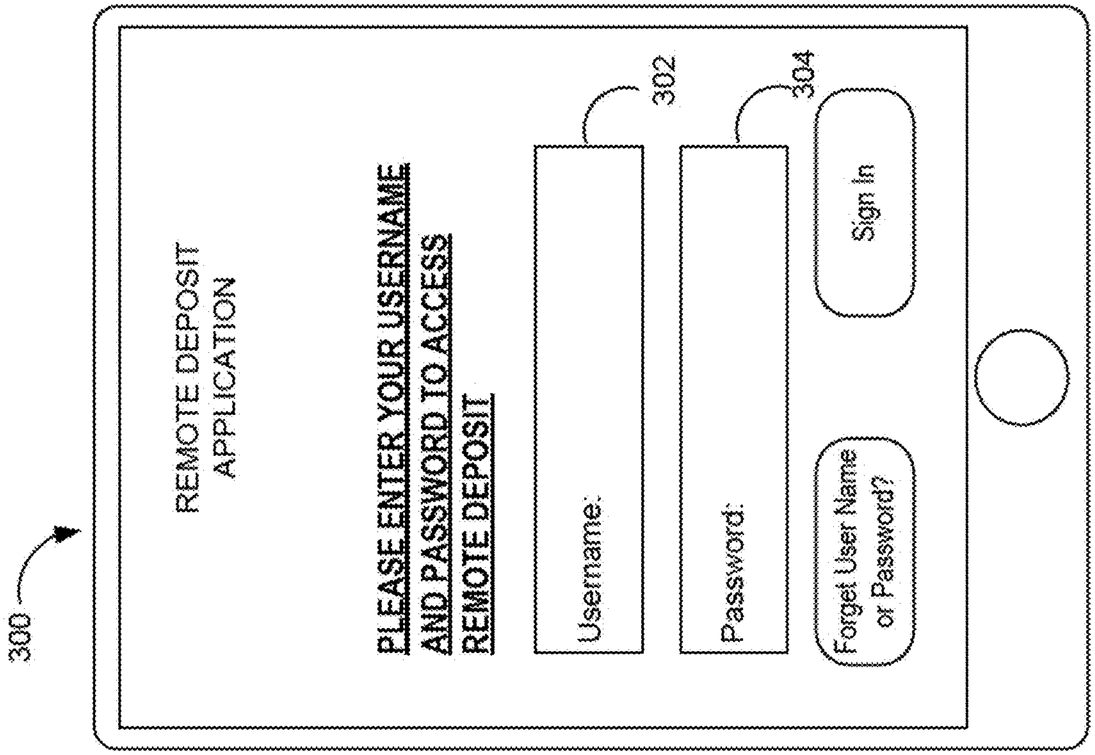
FIGS. 3A-3C depict example screenshots of a graphical user interface for performing a financial transaction using a mobile device according to one illustrative embodiment.
Figure 3B:
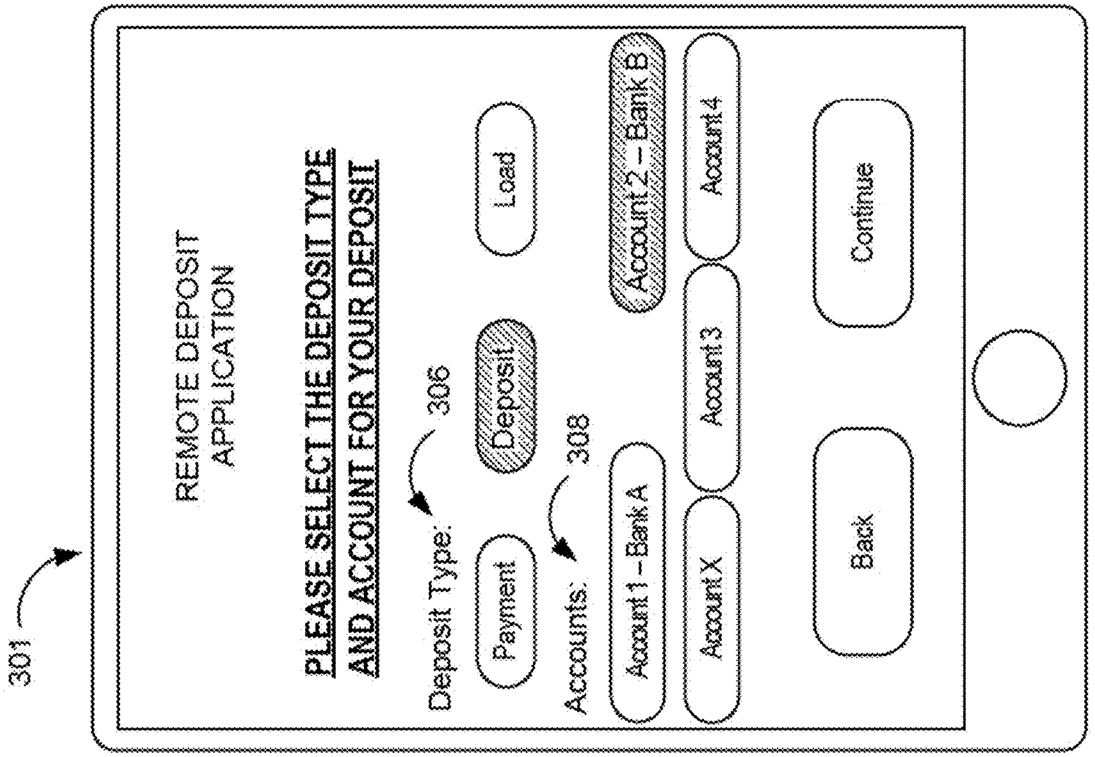
Figure 3C:
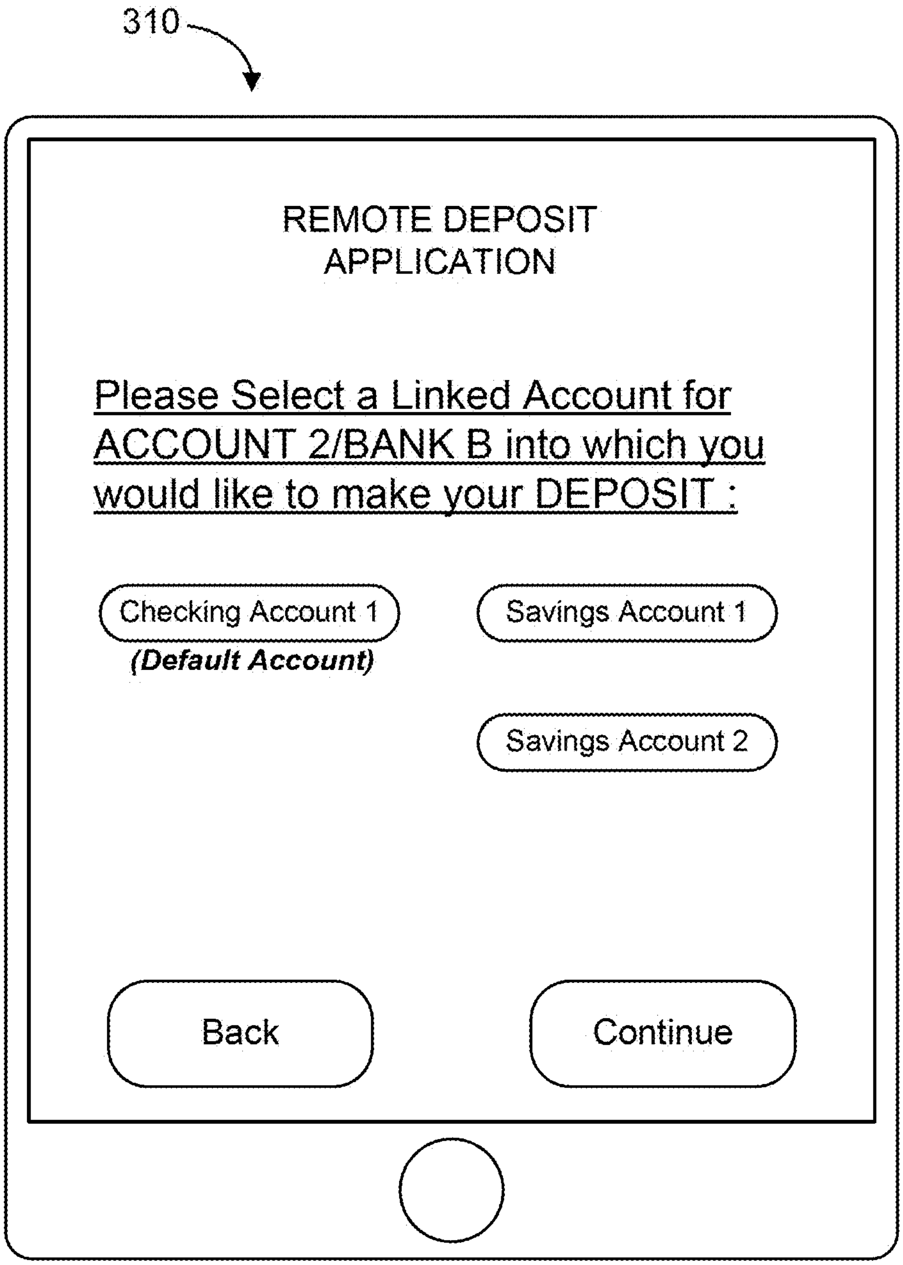

FIGS. 3A-3C depict example screenshots of a graphical user interface for use in performing a financial transaction using a mobile device according to one illustrative embodiment. As shown in FIG. 3A, the exemplary mobile device 300 can have an application stored on a memory element of that mobile device and may be provided in order to securely access and perform a check deposit. As shown, the user may be prompted to enter a username 302 and a password 304 as security information. The user may select from the mobile application running on the mobile device to perform a check deposit, a loan payment, or a load on a pre-existing account (e.g., prepaid card). During this process the user can select which account they wish to apply funds. In one embodiment, this can be performed utilizing Open Account Relationship ("OAR") capability. OAR is an interaction in order to obtain multiple accounts defined to a user's cardholder account. This flow is invoked after the user selects the account type they wish to perform a transaction to. When the message is received, if the consumer has multiple accounts there can be a message back to present a series of accounts for the user to select. If the user only has a single account for the account type selected there may not be a second message. Once the account has been selected, the transaction will be authorized by the Host/AP.

As shown in FIG. 3B, the exemplary mobile device 300 may include the aforementioned deposit type options 306 displayed on the graphical user interface 301. For example, a "deposit" and "payment" option may be provided for selection. The "deposit" option may be available for checking, savings, and other account options. The "payment" option may be available for loan and credit account options. In other embodiments, the mobile device may include an option to "Load" the check amount to a prepaid payment device, such as a prepaid debit or credit card. The financial institution may configure what transactions they support. The user may select a stored mobile account through which the remote deposit will be processed. For example, as shown in FIG. 3B, the user can have one or more stored debit or checking accounts 308 associated with the mobile device. The user may further select a sub account to be used in depositing the check or applying a payment. Each check deposit or payment can be considered a single transaction with a unique transaction sequence number.

In certain embodiments, a host 140 may be able to offer users one of two configuration options for multiple account selection ("MAS"). This option may be configured at the host level and integrated into an option selection at the mobile device. Potential options include OAR or selection of an existing account using MAS. One function of an OAR is to obtain multiple accounts defined to the users cardholder account. The flow is invoked after the user selects the account type they wish to perform a transaction. When the message is received by the transaction processing server, if the user has multiple accounts there will be a message back to entity 1 to present a series of accounts for the user to select. If the user only has a single account for the account type selected there will not be a second message series between the transaction processing server and entity 1. Once the account has been selected, the transaction will be authorized by the Host/AP. OAR may be incorporated into the existing balance inquiry, mini statement, and transfer transaction flows and may function as an interaction between the mobile device and the transaction processing server 120 in order to obtain multiple accounts linked with a user account. This flow is invoked after the user selects the account type they wish to use as the target for the transaction.

When the message is received by transaction processing module 209, there is a check to see if the user has any accounts. If the user has multiple accounts there may be a message sent back to the mobile device 101 to present a series of accounts for which the user can select from. For example, an example screenshot 310 of sub-accounts returned after to the user after selection of the deposit type and account is shown in FIG. 3C. Because a deposit to account 3 was chosen in the example shown in FIG. 3B (shown highlighted), the user can be provided with a checking account and various savings account associated with account no. 3 (e.g., a specific debit card account linked to multiple sub-accounts) associated with to the mobile account on the user's mobile device. If the user only has a single account for the account type selected there may not be a second message series between the transaction processing module 209 and the mobile device 101.

II. Exemplary Methods

Figure 4A:
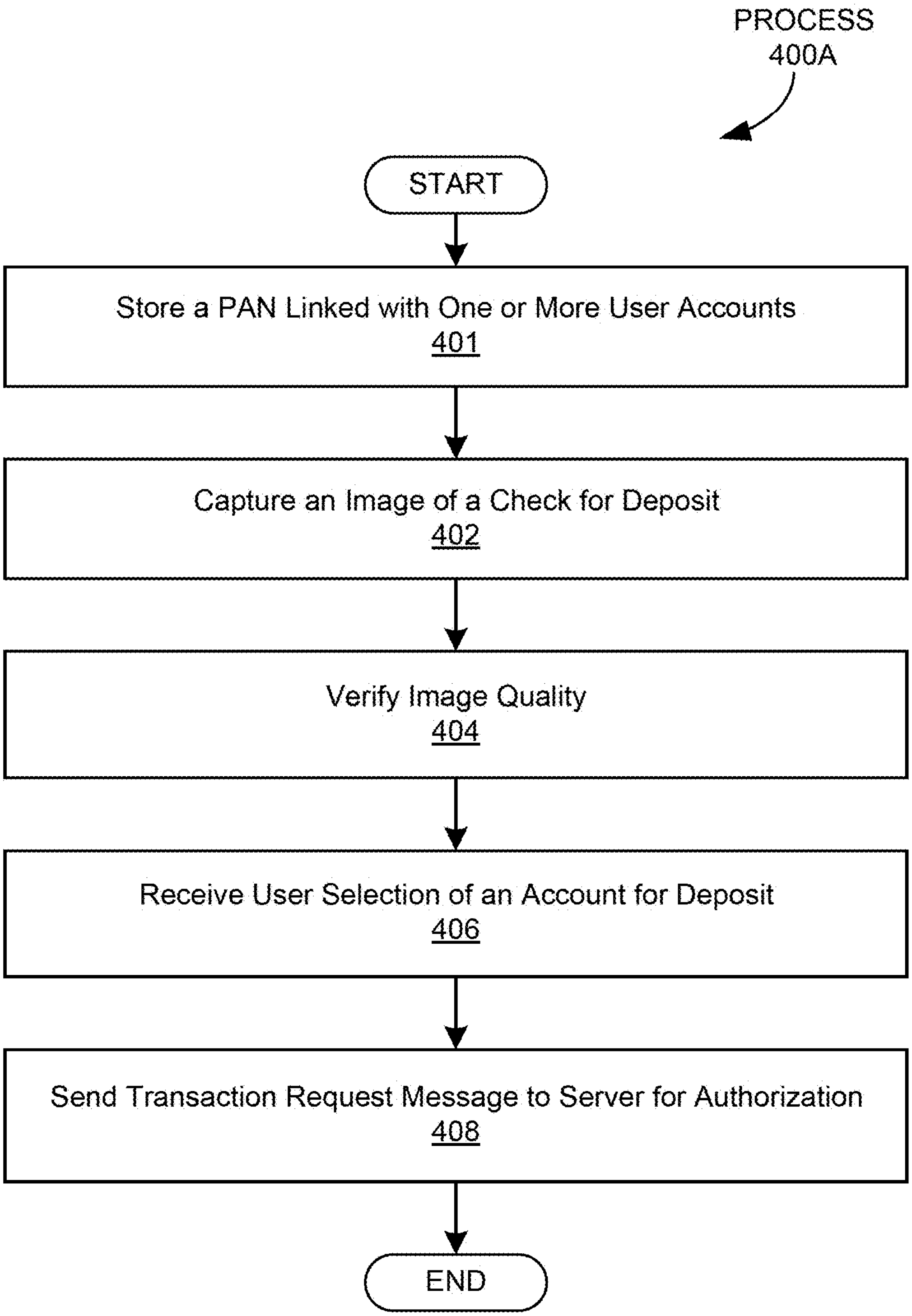
FIG. 4A depicts an example flow chart of a process for performing a financial transaction using a mobile device according to one illustrative embodiment.

FIG. 4A depicts an example flow chart of a process for performing a financial transaction using a mobile device according to one illustrative embodiment. Process 400A is described from the user's mobile device 101 perspective. The process begins at operation 401 where a personal account number ("PAN") linked with one or more user accounts is stored on the mobile device. The mobile device can then be used to capture an image of a check (or other financial token) for a deposit or other transaction at operation 402. The image of the check can then be verified at an imaging module on the mobile device (operation 404). As discussed above, this can be performed by image module 115 stored on the mobile device 101. Or it can be performed by an imaging module at the transaction processing server 120 or other remote server, including a third-party system.

Once the check is verified, the user is prompted to select one of the user's accounts linked with the PAN for the transaction (operation 406). A transaction request message (e.g., ISO message) is thereafter generated at the mobile device based on the captured image and account information and is sent to the transaction processing server 120 to be passed to the host for authorization (operation 408). In an alternative embodiment, the check verification and account information data can also be transferred to a remote server where the ISO message is generated. In one embodiment, the transaction request message can be authorized at the transaction processing server 120 instead of the host 140. In at least certain embodiments, the transaction request message includes account information for the selected accounts (or sub-accounts) and an image capture element. As used herein, the term "image capture element" refers to a verification of the captured image (or in one embodiment, can refer to a representation of the captured image itself) that can be included in the transaction request message for authorization. This completes process 400A according to one embodiment.

Figure 4B:
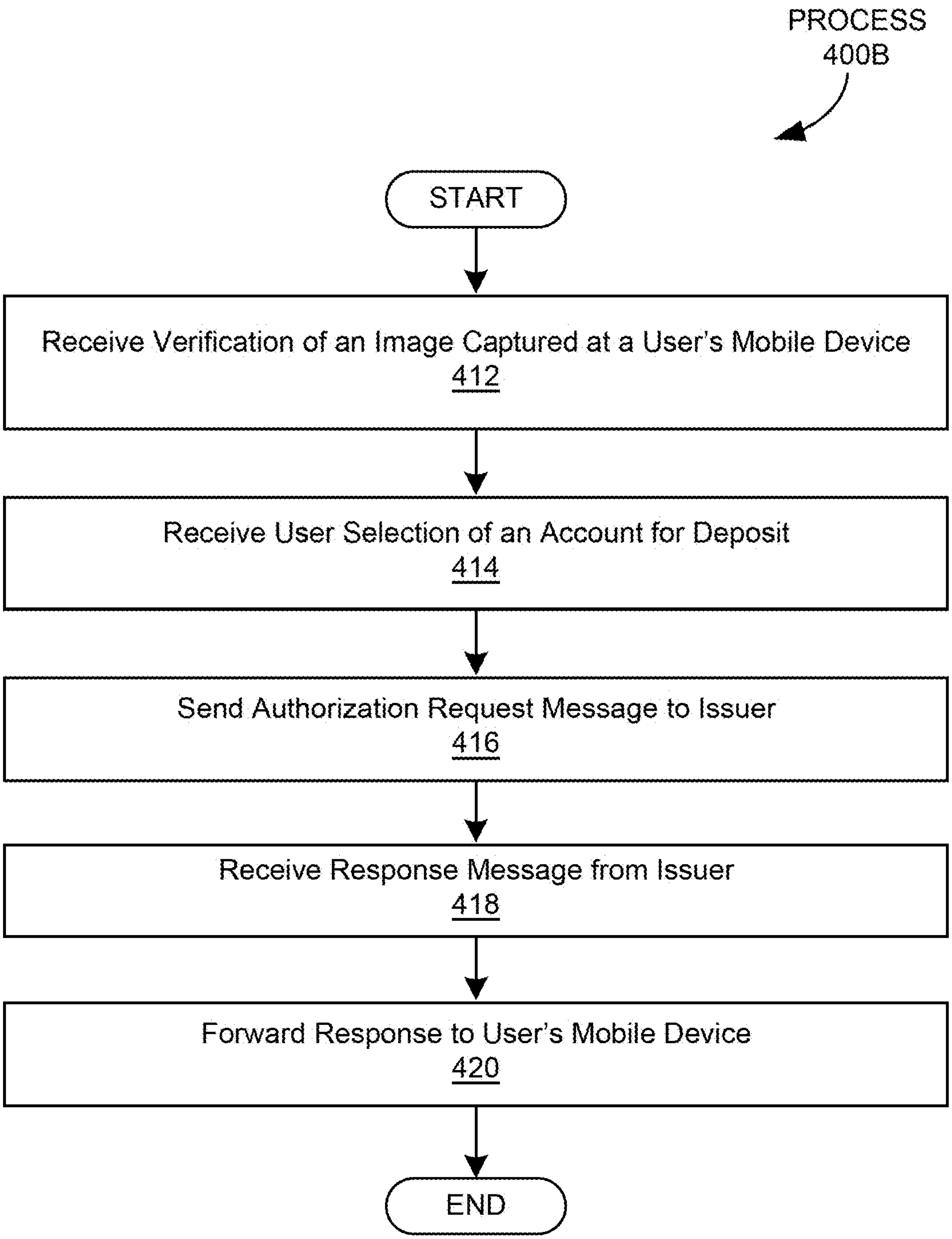
FIG. 4B depicts an example flow chart of a process for performing a financial transaction over a network according to one illustrative embodiment.

FIG. 4B depicts an example flow chart of a process for performing a financial transaction over a network according to one illustrative embodiment. Process 400B is described from the transaction processing server's perspective. The process begins at operation 412 where the transaction processing server 120 receives a verification of the image of a financial instrument captured at the user's mobile device. In one embodiment, this can be received over wireless network 107. This can be accomplished by communicating the image capture token from the mobile device 101 to the transaction processing server 120. The transaction processing server 120 then receives a selection of an account (or sub-account) for the transaction (operation 414). Server 120 then generates an authorization request message and sends it to the host/issuer computer 140 (operation 416). As discussed above, this can also be done directly at the transaction processing server 120 on behalf of the host by accessing authorization database 150/250. A response message is then received from the host/issuer 140 (operation 418) and is then forwarded to the user's mobile device (operation 420). This completes process 400B according to one embodiment.

Figure 5A:
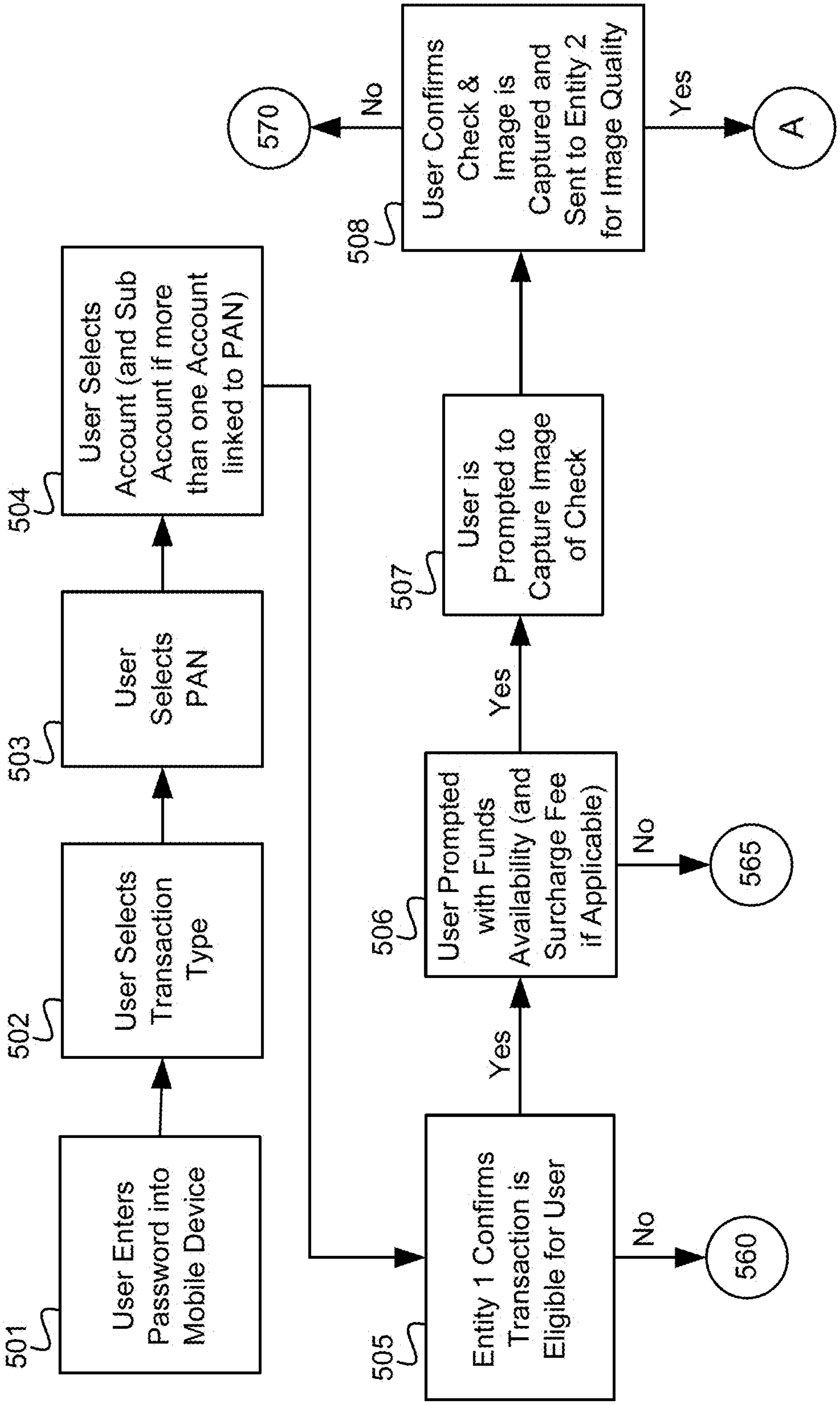
FIGS. 5A-5E depict example flow charts of a process for performing a financial transaction over a network according to an illustrative embodiment.
Figure 5A:
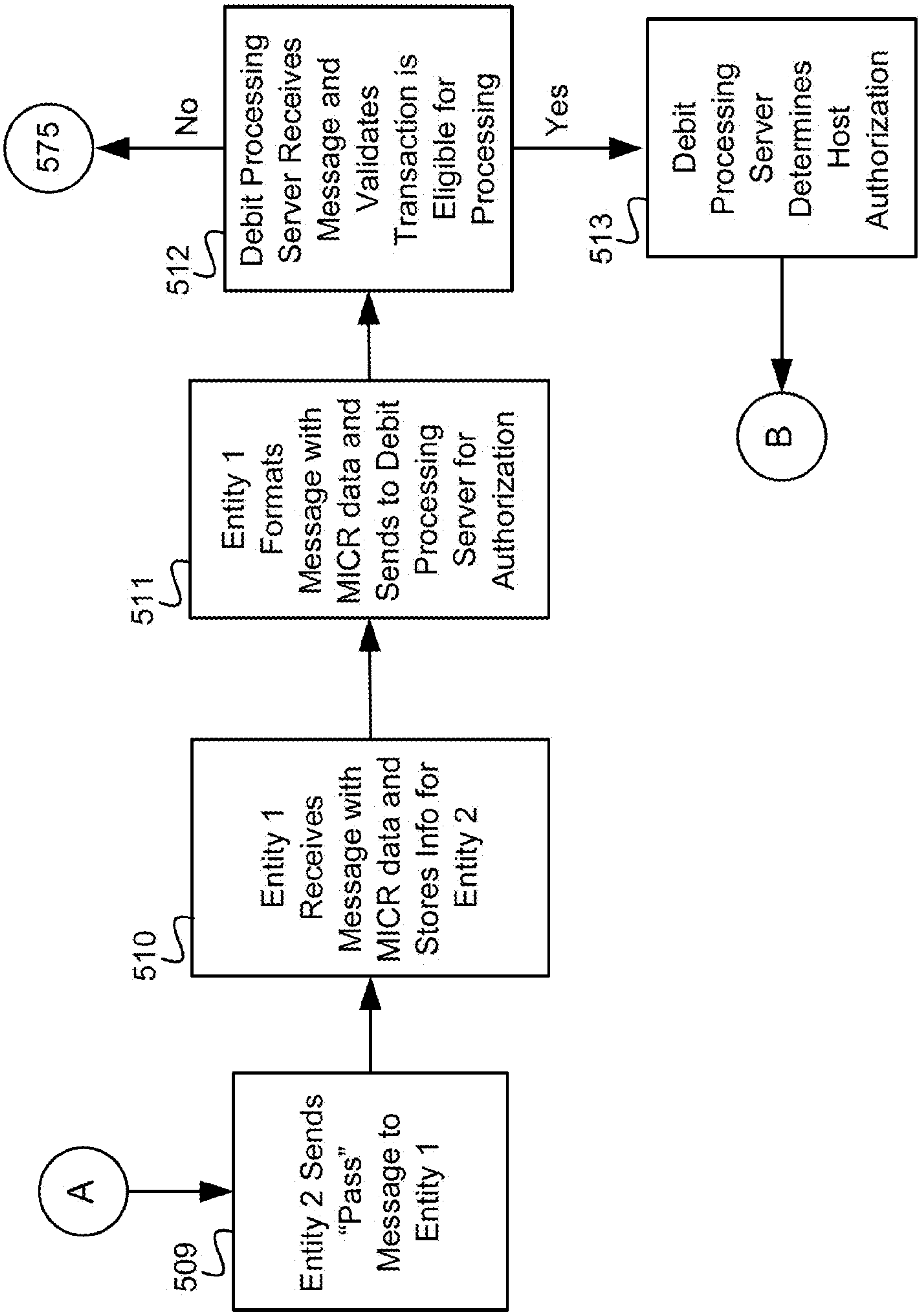
Figure 5A:
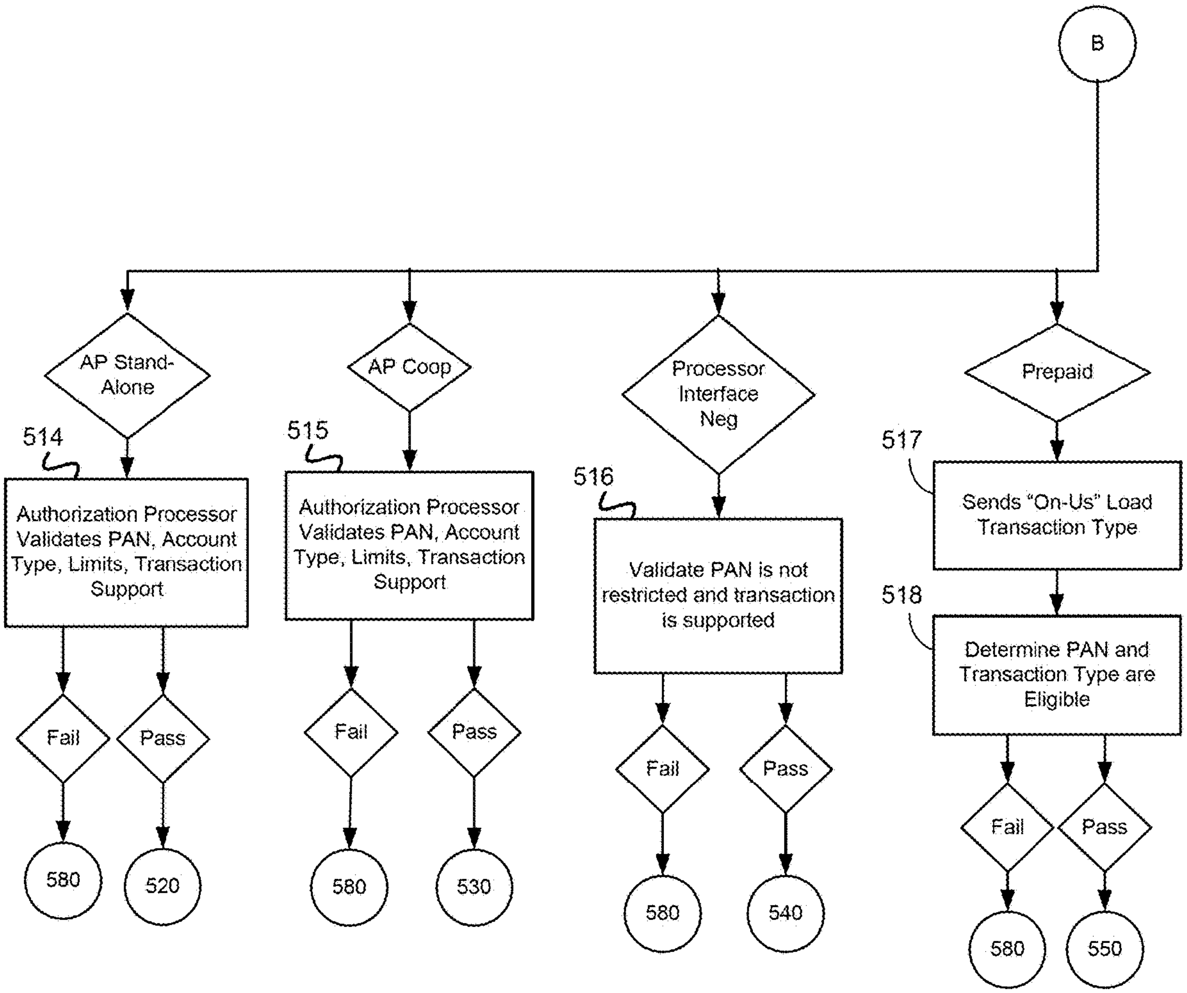

FIGS. 5A-5E depict example flow charts of a process for performing a financial transaction over a network according to an illustrative embodiment. FIG. 5A depicts a flow diagram that illustrates one embodiment of a process for remote deposit capture. As described in the illustrated embodiment, a mobile device, such as, for example, mobile device 101 of FIG. 1B, is used to deposit a check. In operation 501, a user can be prompted to enter security information to an application on a mobile device in order to access account information and remote deposit capabilities through the mobile device and open the application. In operation 502, users may perform a check deposit, a load on a pre-existing account (e.g., prepaid card), or a loan payment from their mobile application running on a mobile device. During this process the user can select which account they wish to apply funds to utilizing, for instance, the OAR capability. If the institution does not use OAR then the additional operations of selecting a specific account may not be needed. ISO messages may be appropriate at the point which OAR accounts are pulled.

For existing cash load transactions occurring at an ATM a first message format received from the transaction processing server 120 can be mapped to a second message format. For instance, the first message format could be expected by the transaction processing server or pre-paid platform from other merchant acquirers for load transactions. The platform can then map the messages from a first transaction type to a second transaction type. A similar evaluation can be performed on the prepaid platform to determine what messages should be derived and sent to the prepaid platform.

Mobile transactions can be logged with a network ID. In the event the receiving system (e.g. Visa) requires that the processing code it receives be something different from the first message format when a response is received from the payment network, the system can translate it to a second message format when a response is received by the transaction processing server platform. The same can hold true for the message being returned from the transaction processing service prepaid platform if something other than a message in the first format is being passed. If it is determined that a load network will be used to support a mobile load transaction, then the transaction traffic can be routed to a payment processing network, e.g., VisaNet. It is assumed that the transactions over a load network can be routed to the payment processing network down the same path as other ATM traffic routes such as PLUS, Interlink, or VisaNet.

In operation 503, the user may select a stored mobile account through which the remote deposit will be processed and at operation 504, the user may select a sub-account to be used for depositing the check, or in other embodiments, for applying a payment. Each check deposit/payment can be considered a single transaction with a unique transaction sequence number.

In one embodiment, a first entity ("entity 1") can include a third party acquirer or transaction processing service which is capable of receiving, logging, and communicating transaction details between various other entities in various communication channels. The first entity can be capable of receiving transaction information in a first format and generating a message including the transaction details in a second format.

In operation 505, a first entity can confirm a transaction is eligible for the user. If eligibility is not confirmed, control is passed to operation 560. The first entity can perform back-end communication with the transaction processing server in order to determine user eligibility for the transaction. In operation 506, in an additional embodiment, the user can be prompted on the mobile device with a notification of the current funds in the selected account or any fees or surcharges which may be incurred during the remote deposit transaction. The fee can then be subtracted from the actual check amount and is separate from any issuer applied fee. In some embodiments, at this point in the flow, the user can be presented with a display indicating the original amount of the check less any fees indicating the actual deposit amount which will be applied. If user declines fees or surcharges, control is passed to operation 565.

In one embodiment, a second entity ("entity 2") can include a third party image processing service, which can include a computer readable program that can be utilized to capture an image on a mobile device and verify the image quality and data for further processing. In operation 507, the user may be instructed to take a picture of their check. The image of the check may be displayed on the mobile device so that the user can confirm the check and captured image. Once confirmed, the mobile device sends the check to a second entity to verify the quality of the image is sufficient for the mobile deposit (operation 508). The mobile application may further process the image of the check to ensure that the quality of the image is suitable for further processing. Additionally, several validation points may be performed to ensure that the item is a valid check and it has not already been process or encoded. If image taken by the mobile device cannot be communicated to entity 2 for validation, control is passed to operation 570.

In operation 509, the quality of the image is verified and a set of security inspections is performed to verify that the check is valid and has not already been processed or encoded. In certain embodiments, the picture from the mobile device may be taken and conformed to "Check 21" image quality before it is passed to an image consolidation process. After the user has completed selecting all of the necessary information to generate a transaction message, the check images are "stored" on the entity 2 platform while the real-time authorization of the transaction is performed.

In operation 510, entity 1 can receive a message verification of "Pass" from entity 2 with the associated magnetic ink character recognition information ("MICR") for the check and any additional verification information necessary for processing the check. In operation 511, entity 1 can (1) format an authorization message in ISO 8583 format, including the MICR information for the check such as an account number, a monetary amount, date, signatures, memo, etc., and (2) forward the formatted message to the transaction processing server 120, such as the debit processing server 130 in FIG. 1A for authorization. In one non-limiting embodiment, the transaction information may be sent as an authorization request message (defined above) according to ISO 8583 message format for account selection and transaction authorization. The ISO message from entity 1 can include several data elements when sending the transaction to transaction processing server for authorization.

In operation 512, the transaction processing server 120 can validate the transaction from the information received in the ISO message and forward the transaction information to a host 140 of FIG. 1A, such as a financial institution, payment processor or bank (through the bank identification number), for real time or near real time authorization. If the transaction processing server 120 cannot validate the transaction, control is passed to operation 575. In operation 513, the debit processing system 130 can then determine which type of deposit is being made and which host authorization is required. From operation 513, the debit processing system directs the authorization request message to one of a plurality of hosts. In further embodiments, certain configurations can be imposed by a client for the remote deposit capture such as maximum "per transaction" threshold limits, etc. The authorization process ("AP") or host or prepaid platform can send a specific response to indicate whether or not the set limit can be overridden by an individual mobile user defined by the user.

In one embodiment, a stand-alone authorization process ("AP") can be used. In operation 514, the stand-alone AP validates the PAN, account type, limits, and transaction support. If the transaction passes, control is passed to operation 520. If not, control is passed to operation 580. In another embodiment, an AP cooperative can be used, e.g., an AP having a host. In operation 515, the cooperative AP validates the PAN, account type, limits, and transaction support. If the transaction passes, control is passed to operation 530; else control is passed to operation 580. In another embodiment, a processor interface negative can be used. In operation 516, the AP validates the PAN is not restricted and that the transaction is supported. If the transaction passes, control is passed to operation 540; else control is passed to operation 580. In another embodiment, a prepaid AP can be used. In operation 517, the prepaid AP sends an "on-us" load transaction. In operation 518, it is determined whether the PAN and transaction type are eligible for the transaction. If the transaction passes, control is passed to operation 550; else control is passed to operation 580. This completes the process of FIG. 5A according to one example embodiment.

Figure 5B:
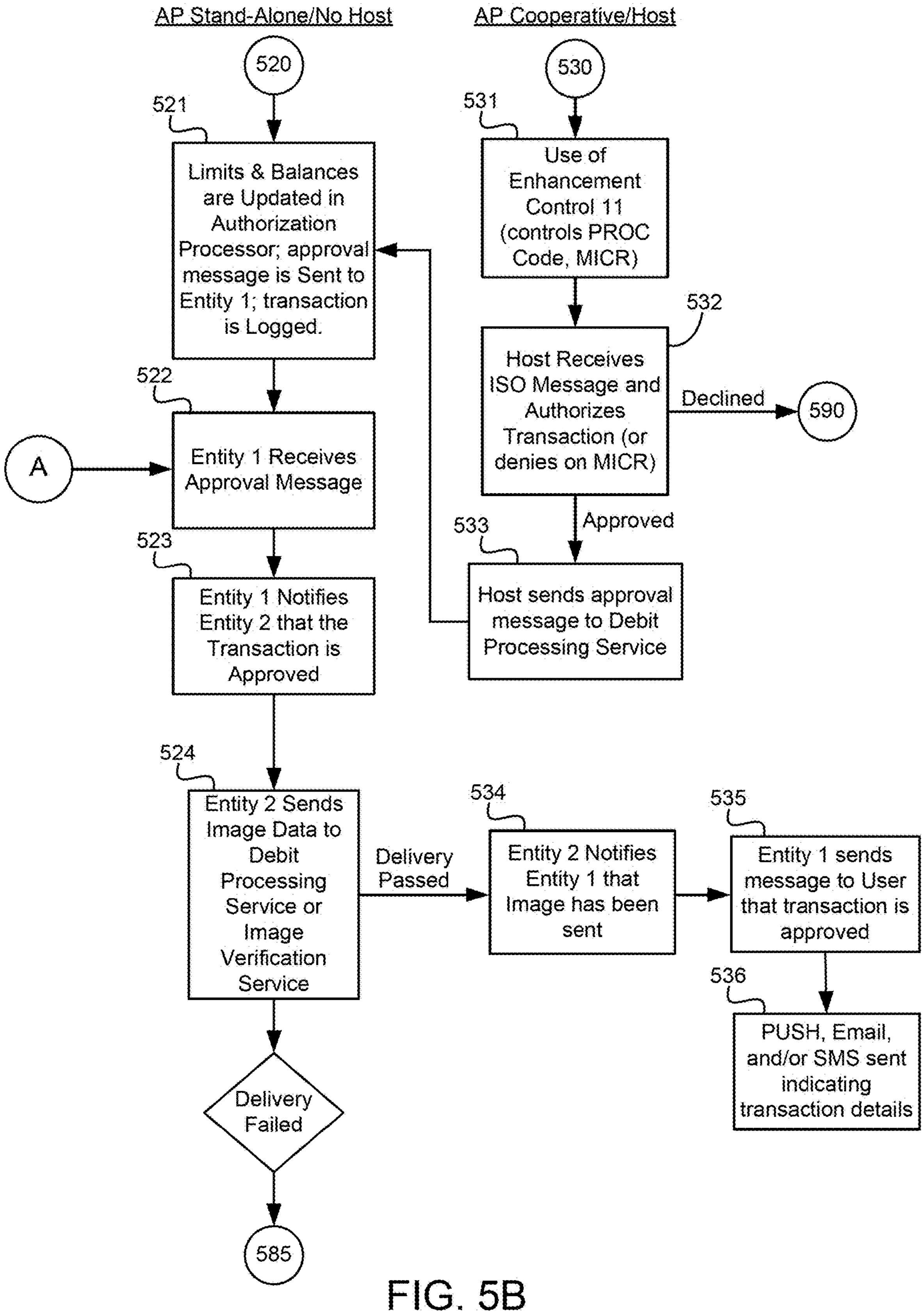
Figure 5B:
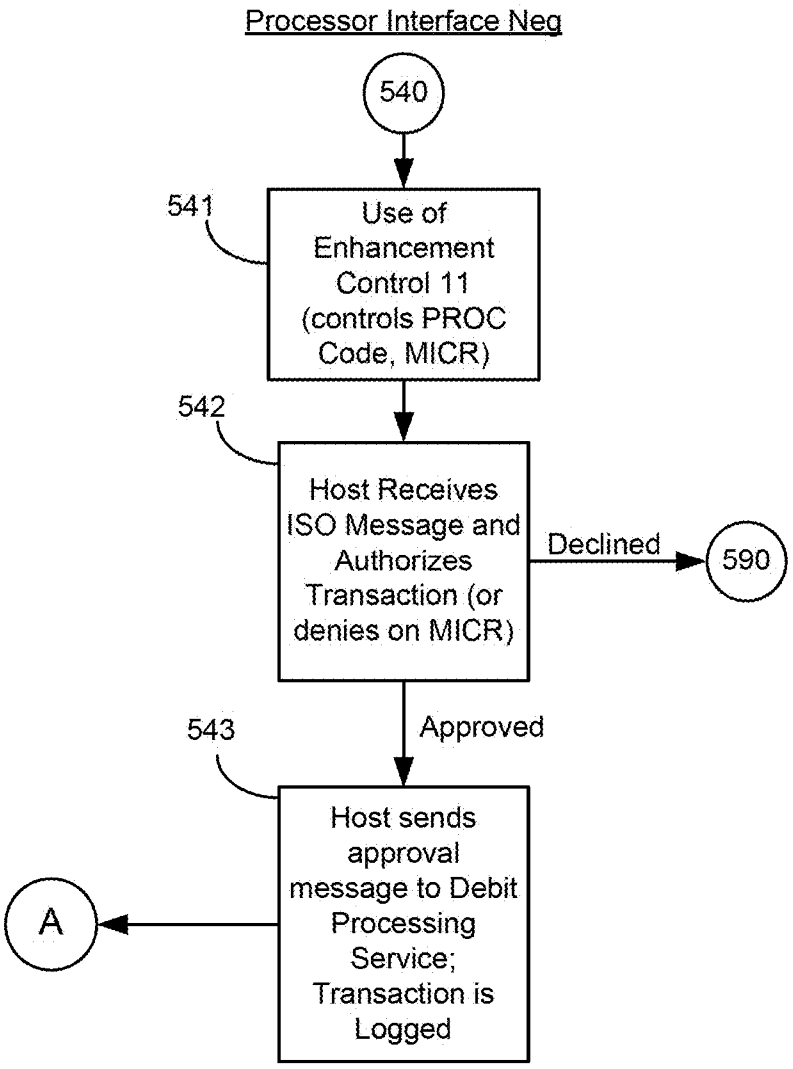

Referring now to FIG. 5B, one embodiment of an example flow diagram of various authorization processes which can be utilized in a remote deposit capture is illustrated. As shown in operation 520, which is a stand-alone AP that does not communicate with a host, the limits and balances are updated on the stand-alone AP database, an approval message is returned to entity 1, and the transaction is logged (operation 521). In operation 522, entity 1 receives an approval message for the remote deposit capture transaction. In operation 523, entity 1 can then notify entity 2 that the check deposit has been approved. In operation 524, the image data can be forwarded to the transaction processing server, image processing service (e.g., NCR, ImageMark Solution) or other entity handling the remote transaction, e.g., Visa. If the image delivery fails, in operation 585, the transaction can be declined and the user can be notified, as will later be discussed with reference to FIGS. 5D-5E. If the delivery of the image passes, entity 2 can then notify entity 1 that the image has been successfully sent to the image processing service in operation 534. Next, in operation 535, the user conducting the remote deposit capture transaction is notified that the transaction has been approved. The user can receive such indication through an email, SMS, MMS, or other push notification (operation 536). The notification can include details of the transaction such as the amount, the fee, net deposit, balance, etc.

Referring still to FIG. 5B, if the transaction approval is processed through an AP having a host, as in operation 530 or a third party as in operation 540, the host/financial institution may have the option of utilizing enhancement control 11 (at operations 531 and 541). Enhancement control 11 has the ability to downgrade the processing code from a first transaction type to a second transaction type for authorization. This allows the host to avoid making any changes. If the host has received the ISO message, then the host (at operations 532 and 542, respectively) can approve or decline the transaction based on receipt and validation of the MICR data. In one embodiment, there are six denial transaction codes specific to MICR that can be used. The ISO Response Code/Description of the six denial transaction codes includes: (1) check rejected; (2) insufficient funds; (3) check rejected—stop payment; (4) check rejected—two signatures required; (5) check rejected—closed account; or (6) check rejected—hold on funds. In operations 533 and 543, respectively, if the transaction is approved, the host sends the authorization response message to entity 1 indicating approval and the approval process follows that previously described with reference to the stand-alone AP in operation 520. In operation 590, if the transaction is declined, the user can be notified that the transaction cannot be completed and can be given a reason for cancellation.

Figure 5C:
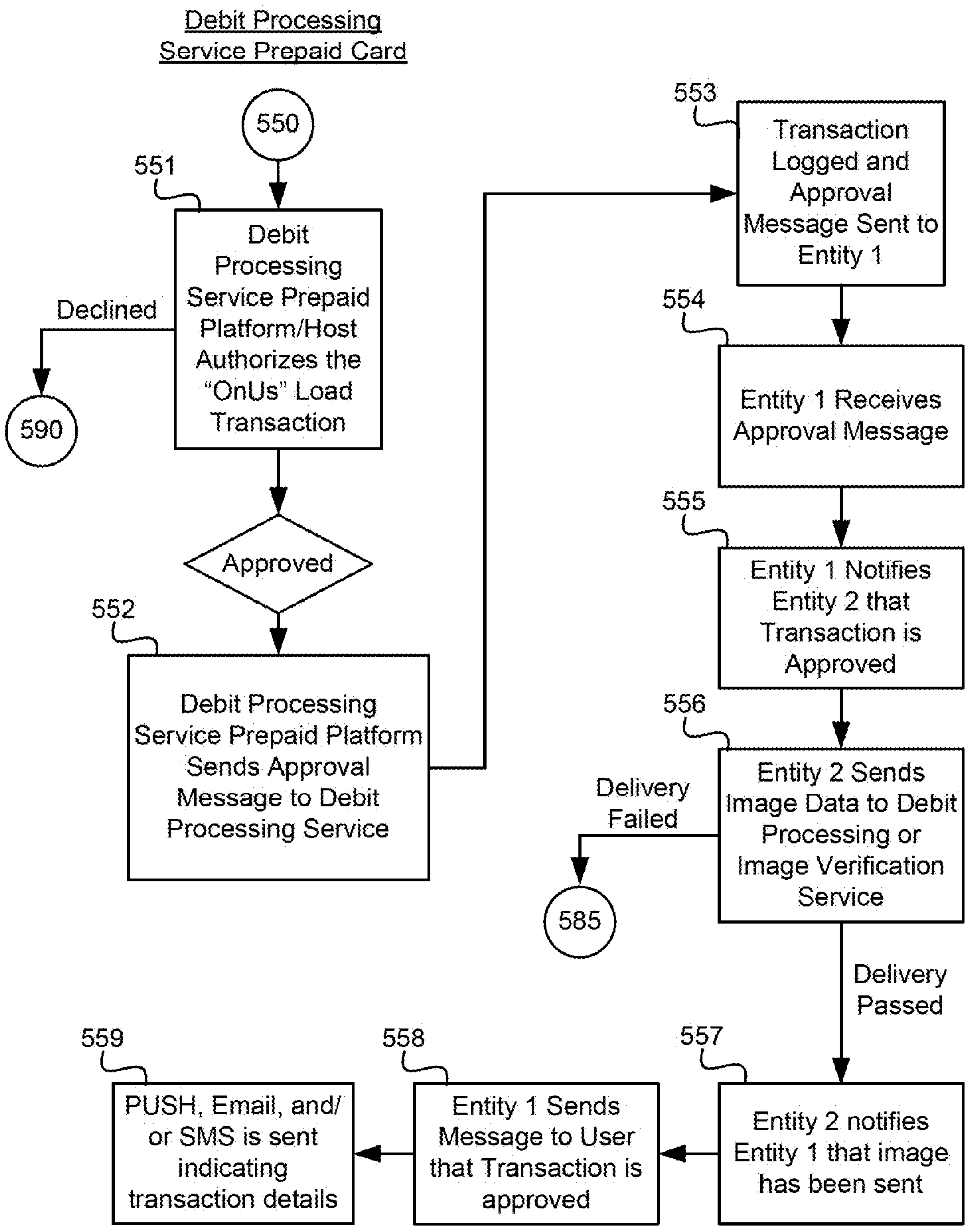

Referring now to FIG. 5C, in the embodiment where a prepaid card is being loaded by a remote deposit of a check (at operation 550), the AP can occur through the transaction processing server prepaid platform in an "on us" load transaction as shown in operation 551. In operation 552, if approved, the transaction processing server prepaid platform can send an authorization response message indicating the approval to the transaction processing server tandem. The approval process then follows the same notification and communication flow as discussed in FIG. 5B operation 520. If the transaction is not approved, control is passed to operation 590. In operation 553, the transaction is logged and an approval message is sent to entity 1. In operation 554, entity 1 can then receive the approval message for the remote deposit capture transaction and communicate it to the user via their mobile device indicating that the deposit/payment/load has been approved. In operation 555, entity 1 can then notify entity 2 that the check deposit has been approved. In operation 556, once entity 2 has received notification of approval, the image data can be forwarded to the transaction processing server, image processing service, or other entity handling the remote transaction, e.g., Visa. If the image delivery fails, in operation 585, the transaction can be declined and the user notified as will later be discussed with reference to FIGS. 5D-5E. If the image delivery passes, entity 2 can then notify entity 1 that the image has been successfully sent to the image processing service in operation 557. Next, in operation 558, the user conducting the remote deposit capture transaction can be notified that the transaction has been approved. The user can receive such indication through an email, SMS, MMS, and/or other push notification (operation 559). The notification can include details of the transaction such as the amount, the fee, net deposit, balance, etc. The user can then be presented with an option to go to the home screen, perform another deposit, or logout once their check deposit is complete.

Figure 5D:
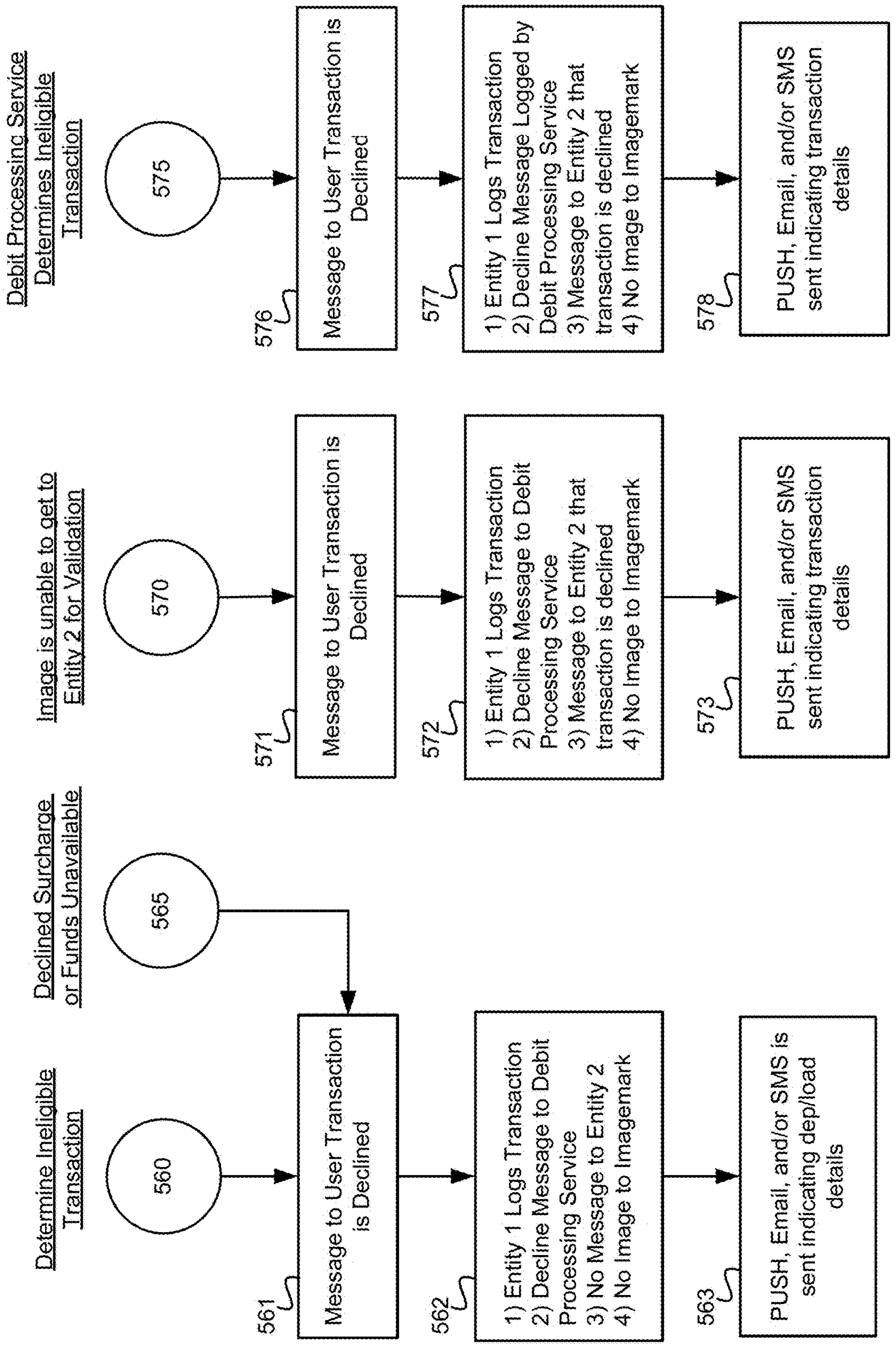

Referring now to FIG. 5D, flow diagrams for various scenarios in which a transaction may be declined are provided. In operation 560, a transaction can be declined if entity 1 determines that a user is ineligible to conduct the transactions, e.g., the user is not registered with the transaction processing server or does not have an account capable of accepting the deposit. Entity 1 determines this ineligibility and logs the transaction, generates the decline message to both the transaction processing server and to the user that includes the reason for declining the transaction (operations 561 and 562). In operation 565, entity 1 can also decline a transaction based on the user's decision to decline a surcharge for the transaction or for lack of funds available in a registered account. Like before, entity 1 determines ineligibility and logs the transaction, generates the decline message to both the transaction processing server and to the user that includes the reason for declining the transaction (operations 561 and 562). A notification can then be sent to the user (operation 563).

In operation 570, a transaction can be declined if the image taken by the mobile device cannot be communicated to entity 2 for validation. Entity 1 then logs the transaction, generates the decline message to both the transaction processing server and to the user that includes the reason for declining the transaction (operations 571 and 572). A notification can then be sent to the user (operation 573). In operation 575, a transaction can be declined if the transaction processing server determines the transaction is ineligible, e.g., the check is fraudulent or cannot be deposited in an account. Entity 1 determines ineligibility, logs the transaction, and generates a message for both entity 2 and the debit processing service that provides notification that the transaction is declined and includes the reason (operations 576 through 578).

Figure 5E:
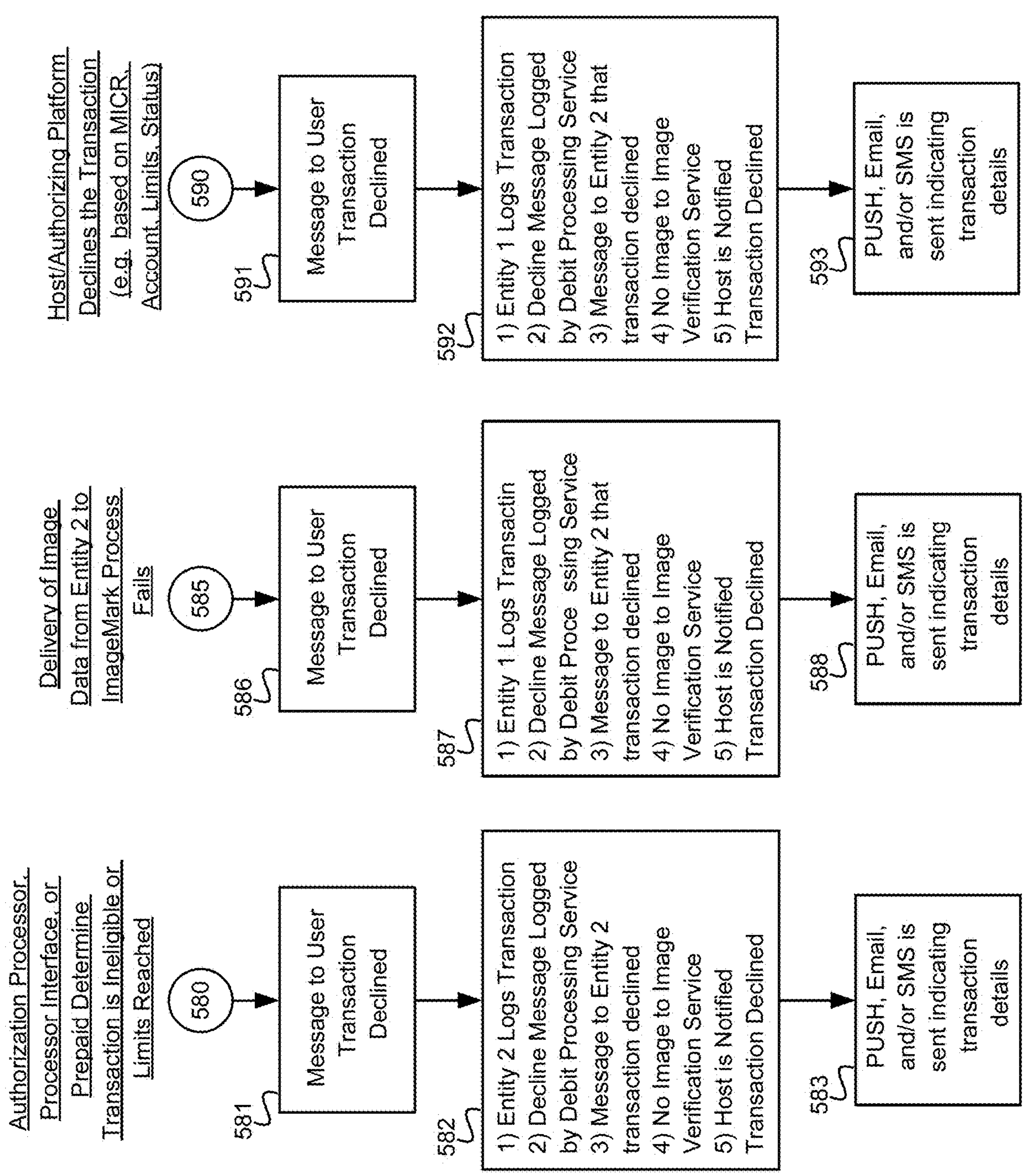

Referring now to FIG. 5E, flow diagrams for various scenarios in which a transaction may be declined are provided. In operation 580, a transaction can be declined by the AP, host, or prepaid platform, e.g., due to limits for deposits made for the day or amount deposited being reached, etc. The AP, host, or prepaid platform can determine this ineligibility and notify the user of the declined transaction (operation 581). Entity 1 and the debit processing system can then log the transaction and a message is generated for both entity 2 and the user that provides notification that the transaction is declined and includes the reason (operation 582). A notification can then be sent to the user (operation 583). Operation 580 can be performed anytime the transaction details are being validated and prior to an image being sent to an image verification process for providing a verified check image for storage.

In operation 585, a transaction can be declined if an image of the check cannot be delivered from entity 2 to the image verification service. In such an embodiment, entity 1 logs the transaction, a message is generated indicating the transaction is declined and the reason (operations 586 and 587). The message is sent to the transaction processing server, entity 2, and the host AP (if any). A notification can then be sent to the user (operation 588).

Finally, in operation 590, a transaction can be declined by the AP, host, or prepaid platform based on account lacking sufficient funds, limits being reached or current status ("suspended") of a user account or the account of the check issuer. In operation 591, the user is notified of the declines transaction. In operation 592, entity 1 logs the transaction, a message is generated indicating the transaction is declined and the reason. The message is sent to the transaction processing server, entity 2, and the host AP (if any). A notification can then be sent to the user (operation 593). During the authorization process, if the transaction is approved by the issuer, host, or AP, a response message may be sent back to the mobile application indicating that the deposit has been approved. The host may have the option during the online authorization process to decline the check item, apply it to an internal account if the check was drawn on another account at the financial institution, or apply holds or immediate funds to the transaction. The response message may be routed through the transaction processing servers 120 in FIG. 1A.

Once the check has been approved, the user may have the option to deposit another check. For example, the mobile application may display a user interface that queries if the user has another check to deposit or apply payment depending on the financial institution's configuration options. The user may be presented with a message indicating that the transaction was approved and that the check should or should not be retained (depending on what the institution wishes to communicate to the user). In one non-limiting embodiment, the displayed message can include: (1) type of transaction (e.g. load to prepaid card, deposit to checking, payment to loan); (2) truncated PAN and/or nickname; (3) truncated account and/or nickname; (4) amount of the transaction; (5) the sequence number assigned to the transaction by the system; (6) the local date and time of the transaction based on the user's preferred time zone; (7) any surcharge or transaction fees; (8) the net amount of the check which was applied in the event there were fees; (9) available and ledger balances if passed; and (10) links to view the front and back of the check image.

If at any point in the process the transaction is interrupted (e.g. cell service is lost, user is taken out of the application, user shuts down device) and the check authorization has not been approved, the transaction can be declined/reversed with an error message indicating that communication was lost/transaction canceled. The user can then re-enter their transaction. If the check deposit transaction was approved by the host but the first entity was unable to display the completion message to the device, the transaction should be completed and the next time the user establishes a session with their mobile device they will see the confirmation information within their SMS, PUSH, or email channels that they have selected for communication.

According to the embodiments described above, users may be provided immediate or near real-time access to funds associated with a deposit, as compared with delayed access that occurs with standard ATM batch processing. The embodiments described above may also provide a host the ability to decline check items in near real-time based on MICR data passed from a mobile device to the transaction processing server and can enable special hold processing and funds availability, as well as limiting liability to the host by avoiding a delay in check authentication. A more efficient way to deposit multiple check items within a single user experience may also be enabled. In one embodiment, this may be enabled by utilizing a linking key.

In one embodiment, each check deposit/payment can be considered a single transaction with a unique transaction sequence number. An ability to link multiple check deposits within a single transaction series may be an available option to a host or financial institution. A user may be able to take a picture of a check, have it authorized, and then continue to take pictures of additional checks. Each check item may be passed to the processing service as a transaction, but a process may be put in place to aggregate the check amounts and pass it to the host as a single net amount. Once the transaction is approved, the images may be passed to the image consolidation process. Each check item may have a sequence number as well as a "linking key" associated with it. The sequence number may be unique to each check. The "linking key" may be constant with the entire deposit/payment transaction. The "linking key" may be passed in the mobile device message from the mobile device to the transaction processing server.

Figure 6A:
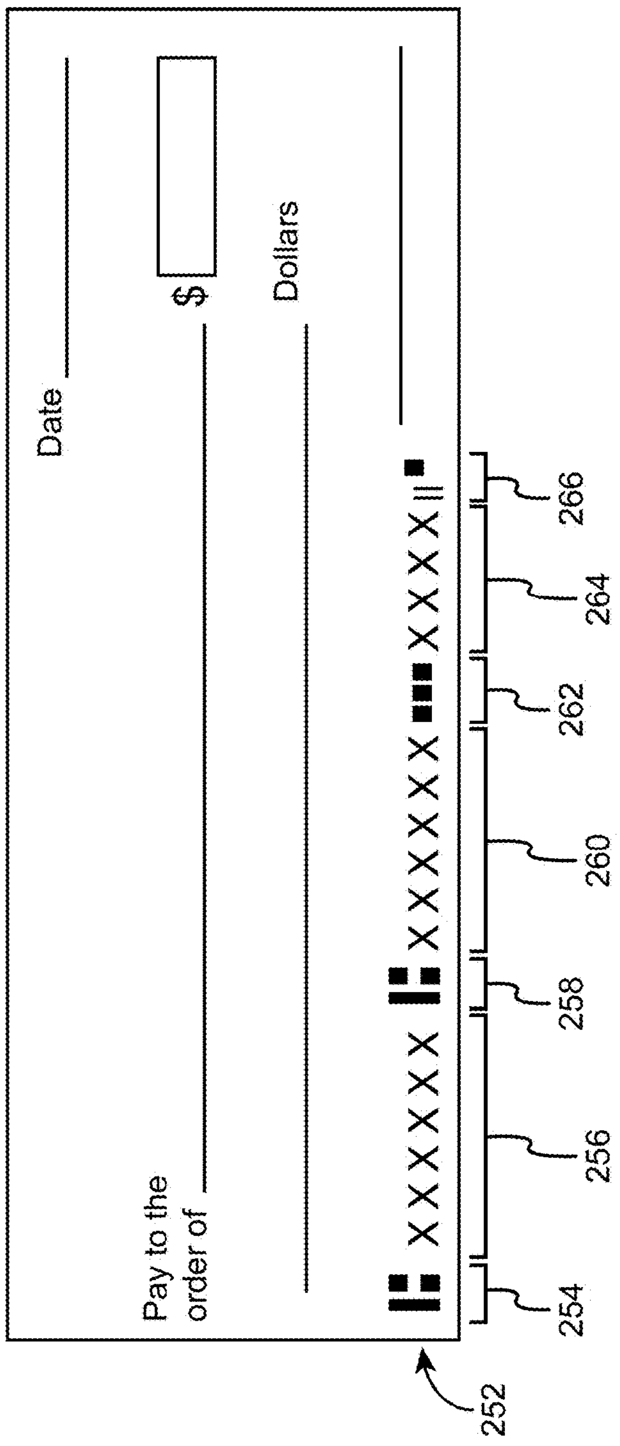
FIG. 6A depicts a financial payment instrument according to one illustrative embodiment.

FIG. 6A depicts a financial payment instrument according to one illustrative embodiment. More particularly, the figure depicts an illustration of paper check. The check may be any suitable personal check or even other types of checks as permitted by law. On the lower edge of check is a line of information 252 commonly termed the MICR data. Included within this line are separation characters 254, 258, 262 and 266 which separate the various pieces of information. Information 256 is a sequence of characters that is the transit routing number, also termed the ABA number. Information 260 is a sequence of characters identifying the customer's account identifier, termed the "on us" data. Information 264 is a sequence of characters identifying the serial identifier of the check. As separators 254, 258, 262 and 266 are symbolic characters (also termed "nonprintable characters"), they are typically translated later into alphanumeric characters. When the separators in the MICR data are later translated into alphanumeric characters, they are typically translated to the characters "T", "O", "A" and "D" which is referred to as the raw TOAD format. Translation may occur because a computer system cannot understand nonprintable characters, and this simple substitution may allow the system (or another system) to eventually parse the information.

Figure 6B:
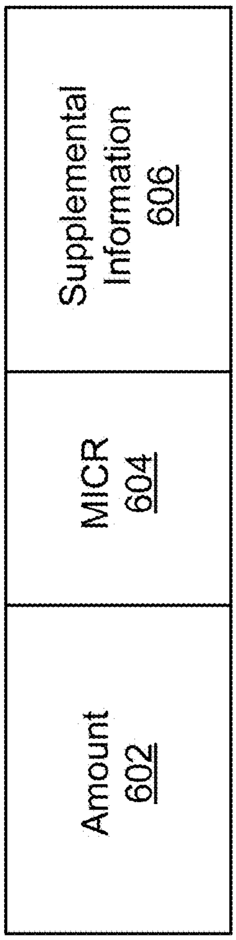
FIG. 6B depicts some example data elements in a transaction request message for processing a financial transaction over a network according to one illustrative embodiment.

FIG. 6B depicts some example data elements in a transaction request message for processing a financial transaction over a network according to one illustrative embodiment. The figure depicts an example of data elements of transaction information that can be communicated as part of a mobile device message, such as mobile device message in a transaction request. Data elements include an amount 602, MICR information 604 including a check number and an account identifier, and optional supplemental information 606 (e.g., authentication information such as a phone number, password, e-mail address, social security number, and/or driver's license number). More or less data elements may be included in the payment card authorization request message in other embodiments of the invention.

Any of the above embodiments may include the ability to allow the host or financial institution to surcharge the transaction. In the event that the institution wishes to surcharge check deposits, the mobile device may need to store the surcharge amount within an institution configuration so that the fee amount can be displayed to the user and accepted by the user prior to the transaction being sent to the transaction processing server for authorization. In alternative embodiments, the transaction processing server or host transmits a message to the mobile device verifying any potential fees and requesting approval for the fees prior to authorization. In other embodiments, the fees and surcharges are automatically deducted from the deposited amount of the check.

Some embodiments of the present innovations include billing methods associated with transactions. In one potential embodiment, unique billing lines are included for the items deposited. In an alternative embodiment the present innovations include the ability to incorporate check images with ATM images into an existing ATM billing structure. In certain embodiments, one indicator may need to be put in place to trigger mobile services billing. At the completion of the any deposit transaction, the user or mobile device may receive a message by PUSH, SMS, or any other message channel indicating that the transaction was approved with the amount, the fee, net deposit, and balance if the appropriate information is passed from the host or AP system.

In certain embodiments, a mobile device such as mobile device 101 operates as a virtual ATM. Certain hosts may conduct universal ATM auditing and reporting that may be impacted or influenced by the use of mobile device 101 in this capacity. Thus, in certain embodiments, in order to ensure that the deposits performed at a mobile device do not impact the ATM totals, the institution may assign a unique acquiring institution ID for traffic that comes from a mobile device or group of mobile devices. Some existing physical ATMs include ATM image capture. In certain embodiments, a transaction processing server may be able to collect the mobile service and ATM images into a single file.

Some above described embodiments of the present innovations may include the ability to handle the check deposit or check payment real-time or near real time and provide the host or financial institution immediate access to the transaction data for immediate funds availability, hold processing, and debit payers accounts. In some embodiments, transactions can be posted to the user account via the online message at the time of the transaction approval, multiple checks or deposits/payments may be linked to create a single user experience. Finally, some embodiments may include unique reporting for check processing with functionality to integrate the process of check deposit/payments made via a mobile device with ATM image-enabled deposit transactions.

The embodiments disclosed herein have a number of advantages. For example, by linking a single unique personal account identifier such as a PAN to multiple account numbers and allowing for the capture of images of financial token such as checks and coupons, embodiments are adapted to provide users with the value associated with those financial tokens in real-time or near real-time. Further, by using a PAN, the existing payment card infrastructure, which may allow issuers and acquirers to communicate, can be used to transport data associated with the financial token to an account issuer for approval, processing, etc.

III. Exemplary Data Processing Apparatus

Provided below are descriptions of some devices (and components of those devices) that may be used in the systems and methods described above. These devices may be used, for instance, to receive, transmit, process, and/or store data related to any of the functionality described above. As will be appreciated by one of ordinary skill in the art, the devices described below may have only some of the components described below, or may have additional components.

Figure 7:
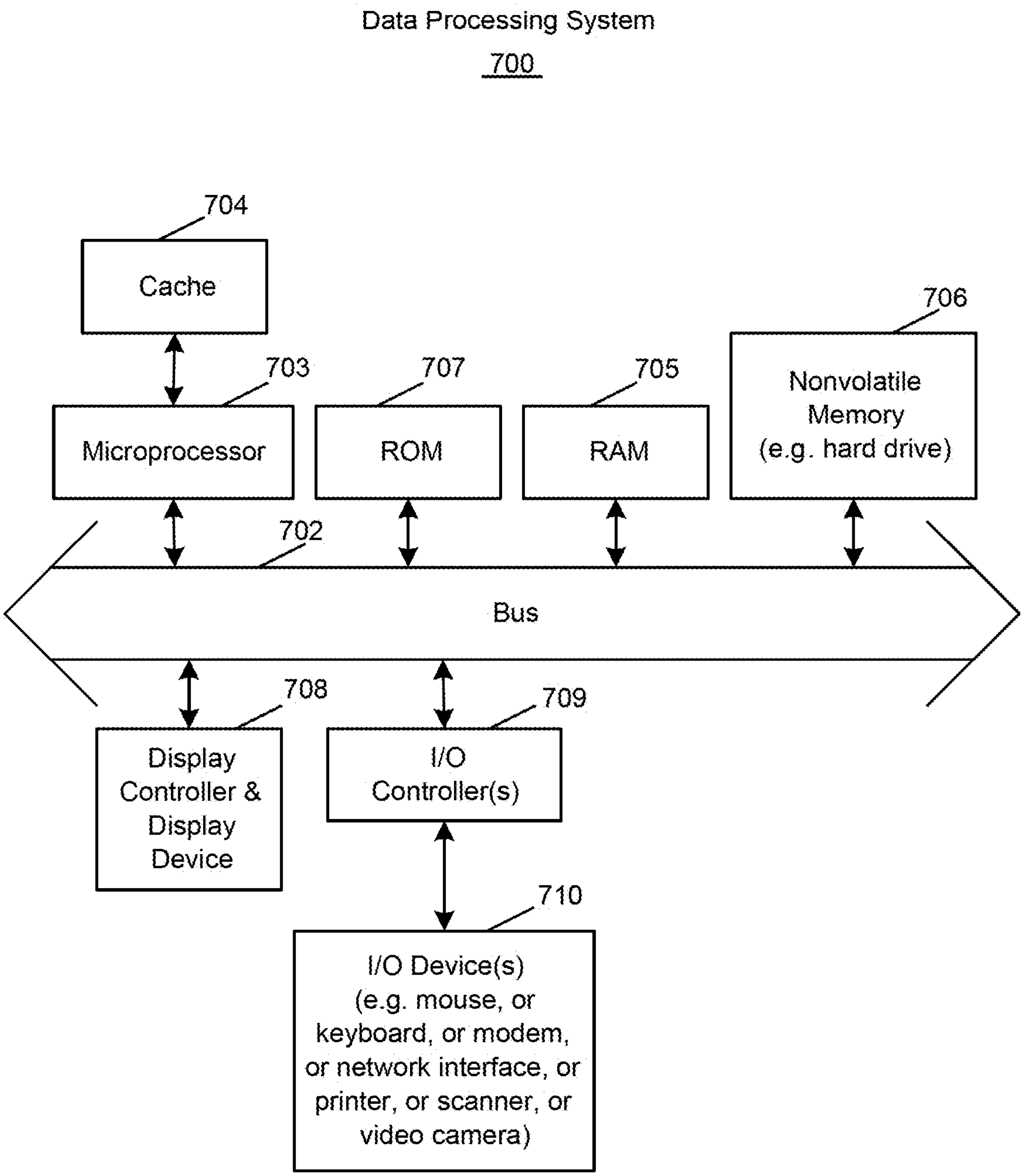
FIG. 7 depicts an example block diagram of a data processing system upon which the disclosed embodiments may be implemented.

FIG. 7 depicts an example block diagram of a data processing system upon which the disclosed embodiments may be implemented. Embodiments of the present invention may be practiced with various computer system configurations such as hand-held devices, microprocessor systems, microprocessor-based or programmable user electronics, minicomputers, mainframe computers and the like. The embodiments can also be practiced in distributed computing environments where tasks are performed by remote processing devices that are linked through a wire-based or wireless network. FIG. 7 shows one example of a data processing system, such as data processing system 700, which may be used with the present described embodiments. Note that while FIG. 7 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 7 may, for example, a personal computer (PC), workstation, tablet, smartphone or other hand-held wireless device, or any device having similar functionality.

As shown, the data processing system 700 includes a system bus 702 which is coupled to a microprocessor 703, a Read-Only Memory (ROM) 707, a volatile Random Access Memory (RAM) 705, as well as other nonvolatile memory 706. In the illustrated embodiment, microprocessor 703 is coupled to cache memory 704. System bus 702 can be adapted to interconnect these various components together and also interconnect components 703, 707, 705, and 706 to a display controller and display device 708, and to peripheral devices such as input/output ("I/O") devices 710. Types of I/O devices can include keyboards, modems, network interfaces, printers, scanners, video cameras, or other devices well known in the art. Typically, I/O devices 710 are coupled to the system bus 702 through I/O controllers 709. In one embodiment the I/O controller 709 includes a Universal Serial Bus ("USB") adapter for controlling USB peripherals or other type of bus adapter.

RAM 705 can be implemented as dynamic RAM ("DRAM") which requires power continually in order to refresh or maintain the data in the memory. The other nonvolatile memory 706 can be a magnetic hard drive, magnetic optical drive, optical drive, DVD RAM, or other type of memory system that maintains data after power is removed from the system. While FIG. 7 shows that nonvolatile memory 706 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 700, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

What is claimed is:

1. A method of performing a remote deposit using a mobile device, the method comprising:

storing, on the mobile device of a user, a unique personal account identifier associated with a mobile account of the user;

obtaining, by the mobile device via a mobile application executing on the mobile device, one or more user accounts of the user associated with the unique personal account identifier, wherein the unique personal account identifier is linked with the one or more user accounts to enable payment to any of the one or more user accounts with the mobile device based on the unique personal account identifier;

displaying, by the mobile device via the mobile application and a graphical user interface, a plurality of transaction types and the one or more user accounts of the user associated with the unique personal account identifier;

receiving, by the mobile device via the mobile application and the graphical user interface, a first selection of the remote deposit as a transaction type and a second selection of one of the one or more user accounts;

in response to the second selection of the one of the one or more user accounts, displaying a list of one or more sub-accounts associated with one of the one or more user accounts;

receiving a third selection of a first sub-account among the one or more sub-accounts, the first sub-account to be used in processing the remote deposit;

communicating the first selection of the remote deposit and the third selection of the first sub-account to a processing server;

receiving, by the mobile device from the processing server, a prompt to capture an image of a check based on determining that the first sub-account is capable of being used in processing the remote deposit;

capturing the image of the check on the mobile device;

verifying, using an image module of the mobile device, that an image quality of the image conforms to a predefined image quality standard for processing the remote deposit;

generating an image capture element from the image based on verifying the image quality, wherein the image capture element includes a verification status of the image;

generating, by the mobile device, a transaction request message that incorporates the image and the image capture element; and transmitting the transaction request message to the processing server, wherein the remote deposit is processed in real-time to the first sub-account managed by a financial institution based on the image and the image capture element.

2. The method of claim 1, wherein the third selection of the first sub-account is communicated in a first message with a first message format, wherein the processing server processes the remote deposit in real-time to the first sub-account managed by the financial institution based on the image and the image capture element;

the processing server generates an authorization request message in a second message format that includes an identifier for the first sub-account and data retrieved from the image; and the processing server transmits the authorization request message to the financial institution in real-time.

3. The method of claim 1, wherein at least two of the one or more user accounts are associated with different financial institutions, and wherein the processing server managing the mobile application on the mobile device supports the remote deposit in real-time with the different financial institutions.

4. The method of claim 1, further comprising:

generating a second message once the remote deposit has been authorized, the second message including a representation of the image of the check to be sent to an image processing service.

5. The method of claim 1, further comprising:

communicating the second selection of the one of the one or more user accounts to the processing server; and receiving, by the mobile device, the list of one or more sub-accounts associated with the one of the one or more user accounts.

6. The method of claim 5, wherein the one or more sub-accounts associated with the one of the one or more user accounts are compatible with the remote deposit as selected transaction type.

7. The method of claim 1, further comprising:

capturing images of multiple checks with the mobile device, wherein the multiple checks are aggregated for processing in a single transaction.

8. The method of claim 1, wherein the transaction request message further includes one or more of a first data element identifying an amount of the remote deposit, a second data element identifying an account identifier of the check or a third data element including supplemental information about the user.

9. The method of claim 1, further comprising:

receiving, by the mobile device based on the unique personal account identifier, the list of one or more sub-accounts associated with the one of the one or more user accounts.

10. The method of claim 1, wherein the transaction request message generated by the mobile device complies with an industry standard message format predefined for transaction request messages and includes the image as an image file.

11. A mobile device comprising:

an imaging component adapted to capture an image of a check;

a memory adapted to store a unique personal account identifier, wherein the unique personal account identifier is linked with one or more user accounts of a user to enable payment to any of the one or more user accounts with the mobile device based on the unique personal account identifier;

an input device adapted to receive user input;

a transceiver to communicate with a processing server; and a processor coupled with the memory, wherein the memory stores instructions that, when executed by the processor, cause the processor to:

obtain the one or more user accounts of the user associated with the unique personal account identifier;

displaying, on graphical user interface, a plurality of transaction types and the one or more user accounts of the user associated with the unique personal account identifier;

receive a first selection of a remote deposit as a transaction type and a second selection of one of the one or more user accounts;

in response to the second selection of the one of the one or more user accounts, display a list of one or more sub-accounts associated with one of the one or more user accounts;

receive a third selection of a first sub-account among the one or more sub-accounts, the first sub-account to be used in processing the remote deposit;

communicate the first selection of the remote deposit and the third selection of the first sub-account to the processing server;

receive, from the processing server, a prompt to capture the image of the check based on determining that the first sub-account is capable of being used in processing the remote deposit;

capture the image of the check on the mobile device;

verify that an image quality of the image conforms to a predefined image quality standard for processing the remote deposit;

generate an image capture element from the image based on verifying the image quality, wherein the image capture element includes a verification status of the image;

generate a transaction request message that incorporates the image and the image capture element; and transmit the transaction request message to the processing server, wherein the remote deposit is processed in real-time to the first sub-account managed by a financial institution based on the image and the image capture element.

12. The mobile device of claim 11, wherein the third selection of the first sub-account is communicated in a first message with a first message format, wherein the processing server processes the remote deposit in real-time to the first sub-account managed by the financial institution based on the image and the image capture element;

the processing server generates an authorization request message in a second message format that includes an identifier for the first sub-account and data retrieved from the image; and the processing server transmits the authorization request message to the financial institution in real-time.

13. The mobile device of claim 11, wherein at least two of the one or more user accounts are associated with different financial institutions, and wherein the processing server supports the remote deposit in real-time with the different financial institutions.

14. The mobile device of claim 11, wherein the instructions, when executed by the processor, further cause the processor to:

generate a second message once the remote deposit has been authorized, the second message including a representation of the image of the check to be sent to an image processing service.

15. The mobile device of claim 11, wherein the instructions, when executed by the processor, further cause the processor to:

communicate the second selection of the one of the one or more user accounts to the processing server; and receive, the list of one or more sub-accounts associated with the one of the one or more user accounts.

16. The mobile device of claim 15, wherein the one or more sub-accounts associated with the one of the one or more user accounts are compatible with the remote deposit as selected transaction type.

17. The mobile device of claim 11, wherein the instructions, when executed by the processor, further cause the processor to:

capture images of multiple checks with the mobile device, wherein the multiple checks are aggregated for processing in a single transaction.

18. The mobile device of claim 11, wherein the transaction request message further includes one or more of a first data element identifying an amount of the remote deposit, a second data element identifying an account identifier of the check or a third data element including supplemental information about the user.

19. The mobile device of claim 11, further comprising:

receive, based on the unique personal account identifier, the list of one or more sub-accounts associated with the one of the one or more user accounts.

20. The mobile device of claim 11, wherein the transaction request message generated by the mobile device complies with an industry standard message format predefined for transaction request messages and includes the image as an image file.

* * * * *